United States Patent
Büttner et al.

(10) Patent No.: US 12,069,033 B2
(45) Date of Patent: Aug. 20, 2024

(54) METHOD FOR PROCESSING TELEGRAMS IN AN AUTOMATION NETWORK, AUTOMATION NETWORK, AND SUBSCRIBERS

(71) Applicant: Beckhoff Automation GmbH, Verl (DE)

(72) Inventors: Holger Büttner, Berlin (DE); Dirk Janssen, Verl (DE); Erik Vonnahme, Salzkotten (DE); Hans Beckhoff, Verl (DE); Thomas Rettig, Rheda-Wiedenbrück (DE); Thorsten Bunte, Gütersloh (DE); Johannes Beckhoff, Schloß Holte-Stukenbrock (DE)

(73) Assignee: Beckhoff Automation GmbH, Verl (DE)

( * ) Notice: Subject to any disclaimer, the term of this patent is extended or adjusted under 35 U.S.C. 154(b) by 246 days.

(21) Appl. No.: 17/686,366

(22) Filed: Mar. 3, 2022

(65) Prior Publication Data
US 2022/0247728 A1  Aug. 4, 2022

Related U.S. Application Data

(63) Continuation of application No. PCT/EP2020/070844, filed on Jul. 23, 2020.

(30) Foreign Application Priority Data

Sep. 19, 2019 (DE) ...................... 10 2019 125 270.9

(51) Int. Cl.
*H04L 9/40* (2022.01)
*H04L 12/40* (2006.01)

(52) U.S. Cl.
CPC .... *H04L 63/0428* (2013.01); *H04L 12/40019* (2013.01); *H04L 2012/4026* (2013.01)

(58) Field of Classification Search
CPC ........... H04L 63/0428; H04L 12/40019; H04L 12/40; H04L 9/065; H04L 9/0618; H04L 2012/4026

(Continued)

(56) References Cited

U.S. PATENT DOCUMENTS 4,633,309 A * 12/1986 Li ...................... H04N 21/4627
                                                                            380/208
7,349,420 B1 * 3/2008 Toth .................... H04L 12/2856
                                                                            370/437

(Continued)

FOREIGN PATENT DOCUMENTS

| DE | 102012221487 B3 | 5/2014 |
| DE | 102014102678 A1 | 12/2014 |
| DE | 102015120242 B3 | 2/2017 |

OTHER PUBLICATIONS

"EtherCAT—the Ethernet Fieldbus," EtherCAT Technology Group, Nov. 2012, 21 pages.

(Continued)

*Primary Examiner* — Amare F Tabor
(74) *Attorney, Agent, or Firm* — Dorsey & Whitney LLP

(57) ABSTRACT

A method for processing telegrams in an automation network provides a master subscriber to at least partially encrypt and output telegrams, respectively, to another subscriber. The other subscriber comprises an input port, a receiving logic connected to the input port, a decryption unit connected to the receiving logic, and a processing unit connected to the decryption unit and the receiving logic. The receiving logic is configured, when a telegram at least partially encrypted by the master subscriber is present at the input port, to forward an encrypted portion of the telegram (Continued)

to the decryption unit. The decryption unit is configured to decrypt the encrypted portion of the telegram with a key, and to forward the encrypted portion to the processing unit for processing. If an unencrypted telegram is present at the input port, the receiving logic is configured to forward the unencrypted telegram to the processing unit for processing.

19 Claims, 5 Drawing Sheets

(58) Field of Classification Search
USPC .................................................. 713/150
See application file for complete search history.

(56) References Cited

U.S. PATENT DOCUMENTS

| | | | | |
|---|---|---|---|---|
| 7,363,056 B2* | 4/2008 | Faisy | ............... | H04W 12/06 |
| | | | | 455/410 |
| 7,757,021 B2* | 7/2010 | Wenzel | ............... | H04L 25/0262 |
| | | | | 710/60 |
| 8,315,646 B2* | 11/2012 | Karjalainen | ............ | H04W 4/02 |
| | | | | 455/552.1 |
| 8,353,050 B2* | 1/2013 | Klassen | ............... | H04W 12/50 |
| | | | | 380/255 |
| 8,812,759 B2* | 8/2014 | Luttenbacher | ............ | H04L 1/22 |
| | | | | 710/106 |
| 9,332,009 B2* | 5/2016 | Varriale | ............... | H04L 63/0853 |
| 10,098,207 B2 | 10/2018 | Mokhtari et al. | | |
| 10,484,520 B2 | 11/2019 | Bunte et al. | | |
| 10,663,957 B2* | 5/2020 | Clark | ............... | H04W 4/80 |
| 10,855,490 B2* | 12/2020 | Leng | ............... | H04L 12/40013 |
| 2007/0244819 A1* | 10/2007 | Goeke | ............... | H04N 21/4367 |
| | | | | 705/52 |
| 2010/0211201 A1* | 8/2010 | Papenfort | ............ | H04L 41/0806 |
| | | | | 700/95 |

OTHER PUBLICATIONS

International Search Report and Written Opinion dated Sep. 29, 2020 in connection with PCT/EP2020/070844, 18 pages including English translation.

International Preliminary Report on Patentability dated Nov. 16, 2021 in connection with PCT/EP2020/070844, 43 pages including English translation.

"EtherCAT—The Ethernet Fieldbus," EtherCAT Technology Group, Dec. 2018, 37 pages with English translation.

Wieczorek, et al., Wieczorek, Felix et al. "Towards Secure Fieldbus Communication," Safecomp Sep. 25, 2012, LNCS 7612, pp. 149-160.

* cited by examiner

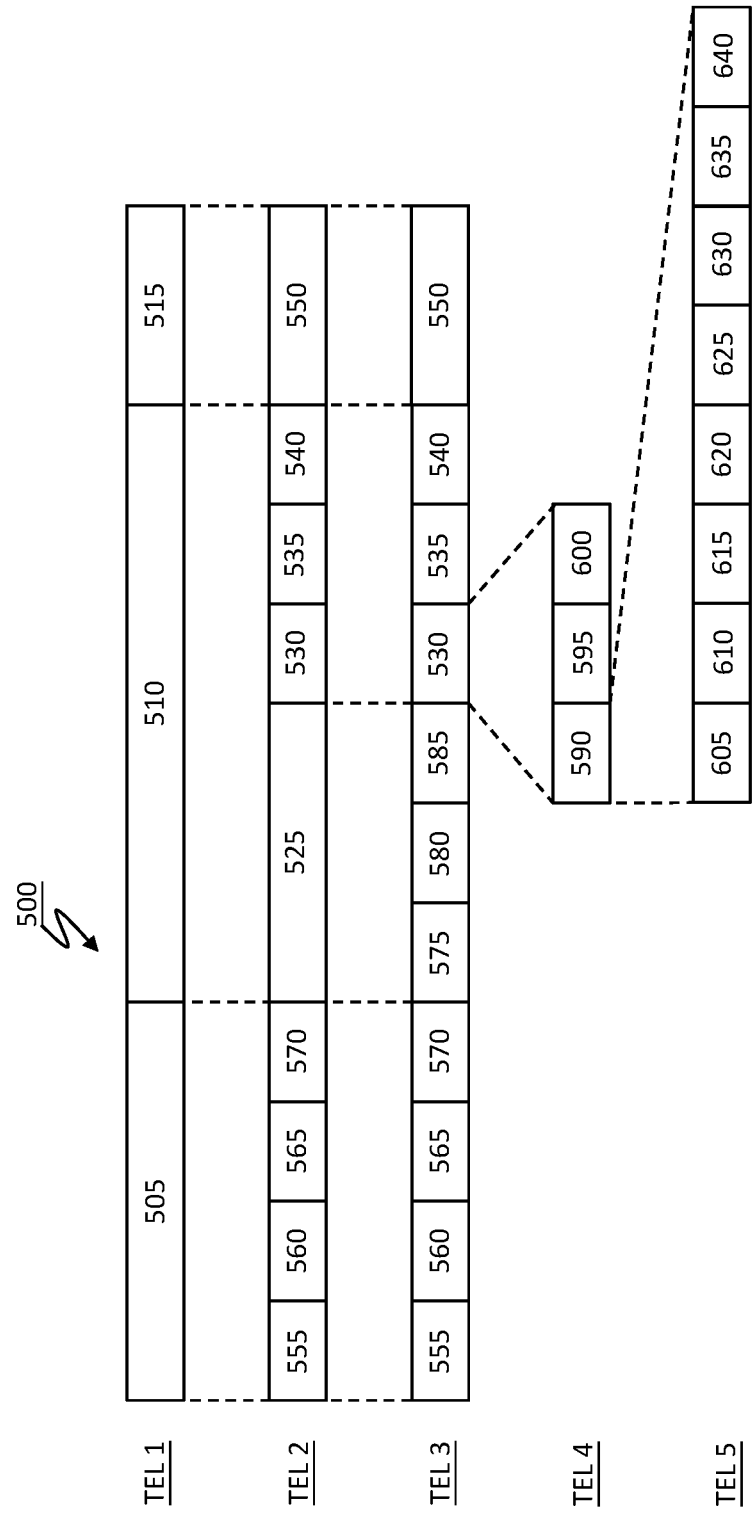

METHOD FOR PROCESSING TELEGRAMS IN AN AUTOMATION NETWORK, AUTOMATION NETWORK, AND SUBSCRIBERS

CROSS-REFERENCE TO RELATED APPLICATIONS

The application is a continuation of International Patent Application No. PCT/EP2020/070844, filed 23 Jul. 2020, entitled "Method for Processing Telegrams in an Automation Network, Automation Network, Master Subscriber and Slave Subscriber," which claims priority to German patent application DE 10 2019 125 270.9, filed 19 Sep. 2019, entitled "Verfahren zum Verarbeiten von Telegrammen in einem Automatisierungsnetzwerk, Automatisierungsnetzwerk, Masterteilnehmer and Slaveteilnehmer," each of which is incorporated by reference herein, in the entirety and for all purposes.

FIELD

The present invention relates to a method for processing telegrams in an automation network. Furthermore, the invention relates to an automation network for carrying out the method and to a master subscriber and to a slave subscriber for the automation network.

BACKGROUND

Automation networks are often operated as "field-bus systems". These are industrial bus systems that enable real-time capable control of the machines or systems of the automation network, wherein the machines or systems of the automation network are controlled by programmable logic controllers (PLCs). The PLC uses the field-bus system for communication of the field devices, e.g. of sensors and actuators of the machines or systems of the automation network with the PLC. If a plurality of network subscribers sends telegrams via the same data line in the automation network, which may be embodied as a wired or wireless bus system, there must be a way for the network subscribers to share the same data line for transmitting data. For this purpose, defined hierarchies and standardized data transmission protocols are provided.

In most cases, the field-bus systems operate in so-called "master-slave mode". This means that at least one network subscriber is embodied as a master subscriber and takes over the control of the processes, while the other network subscribers take over the processing of subtasks in the control mode of the automation network as slave subscribers. Data is exchanged in the automation network by telegrams that are output by the master subscriber to the slave subscribers. The slave subscribers read the output data addressed to them from the telegram and insert their input data into the telegram and send the telegram back to the master subscriber.

Automation networks are frequently embodied as Ethernet-based networks or, respectively, as an Ethernet-based field bus. This means that the real-time capable data transmission protocol on which the telegram traffic in the automation network is based may e.g. be the EtherCAT protocol. An automation network with underlying EtherCAT data transmission protocol, hereinafter referred to as EtherCAT network for short, which is known from the prior art, comprises a direct connection between the master subscriber and the multiple slave subscribers. The master subscriber and the multiple slave subscribers are therefore each connected to one another via a point-to-point connection without intermediate subscribers, e.g. in the form of network distributors, via a data line network.

The above-mentioned machine controller may be embodied as a local machine controller and networked with other machine controllers of other machines or systems. As a rule, the machines or systems have at least one interface for an external connection, e.g. to the Internet, and/or at least one interface to the control level. In this context, a control level refers to a central control level of the machines or systems, i.e. a central monitoring level that comprises the individual machines or systems together with their respective local controls. The local machine controllers may therefore be connected to the control level or the Internet via a further Ethernet network.

The connection to the Internet in particular poses the risk of an unwanted hacker attack on the local machine controllers and/or the central machine controller. A remedy against such a hacker attack may be the installation of a firewall for the local machine control that includes the master subscriber. This is sufficient because access to the slave subscribers is only possible via the master subscriber.

If the EtherCAT network is extended by network distributors which may be embodied as so-called switches or branches, an external attack on a slave subscriber may take place via an input/output port of a network distributor, which is e.g. connected to the Internet. Such a hacker attack may manipulate a control task or, respectively, the control operation in the EtherCAT network. This problem may also occur with other Ethernet-based field buses, such as the PROFINET field-bus system. A known prior art way to overcome this problem is to encrypt the connection between the controller, i.e. the master subscriber, and the peripheral device, i.e. the slave subscriber. However, the disadvantage of encrypting the connection is that e.g. an encrypted PROFINET telegram must first be received in full in the slave subscriber before decryption is possible, since the PROFINET telegrams are each embodied as individual telegrams, i.e. they are only intended for a single slave subscriber. Telegrams with the underlying EtherCAT protocol, on the other hand, are embodied as so-called pass-through telegrams, i.e. they may be processed by a plurality of slave subscribers in a pass-through, i.e. in each case in parallel with the continuous receipt of the remaining EtherCAT telegram. Accordingly, an EtherCAT network requires a method for ensuring secure communication that deviates from the state of the art.

SUMMARY

The present invention provides an optimized method for processing telegrams in an automation network, which increases confidentiality during data transmission and provides protection against unauthorized access. Furthermore, the invention provides an improved automation network, an improved master subscriber and an improved slave subscriber.

EXAMPLES

According to a first aspect, a method for processing telegrams in an automation network and network is proposed. The automation network has a plurality of network subscribers which are embodied in the form of a master-slave structure. At least one network subscriber of the automation network is embodied as a master subscriber and at least one network subscriber of the automation network is embodied as a slave subscriber. The master subscriber is embodied to output telegrams to the at least one slave subscriber. Furthermore, the master subscriber is embodied to at least partially encrypt the telegrams in each case. The at least one slave subscriber comprises an input port, a receiving logic connected to the input port, a decryption unit connected to the receiving logic, and a processing unit embodied to process the telegrams in pass-through and connected to the decryption unit and the receiving logic.

The receiving logic is embodied, if a telegram at least partially encrypted by the master subscriber is present at the input port of the at least one slave subscriber, to forward an encrypted portion of the at least partially encrypted telegram to the decryption unit. The decryption unit is embodied to decrypt the encrypted portion of the at least partially encrypted telegram with a key on the fly and to forward the decrypted portion of the at least partially encrypted telegram to the processing unit. The processing unit is embodied to process the decrypted portion of the at least partially encrypted telegram. The receiving logic is embodied to forward the unencrypted telegram to the processing unit if an unencrypted telegram from the master subscriber is present at the input port of the at least one slave subscriber. The processing unit is embodied to process the unencrypted telegram.

According to a second aspect, an automation network is proposed. The automation network comprises a plurality of network subscribers, wherein the network subscribers of the automation network are embodied as a master-slave structure, so that at least one network subscriber is embodied as a master subscriber and at least one network subscriber is embodied as a slave sub-scriber. The master subscriber is embodied to output telegrams to the at least one slave subscriber. The master subscriber is embodied to at least partially encrypt the telegrams. The at least one slave subscriber comprises an input port, a receiving logic connected to the input port, a decryption unit connected to the receiving logic and a processing unit embodied to process telegrams in passing and connected to the encryption unit and the receiving logic.

The receiving logic is embodied, in the event that a telegram at least partially encrypted by the master subscriber is present at the input port of the at least one slave subscriber, to forward the at least partially encrypted telegram to the encryption unit. The decryption unit is embodied to decrypt an encrypted portion of the at least partially encrypted telegram on the fly with a key and to forward it to the processing unit. The processing unit is embodied to process the decrypted portion of the at least partially encrypted telegram on the fly. The receiving logic is embodied, in the event that a telegram unencrypted by the master subscriber is present at the input port of the at least one slave subscriber, to forward the unencrypted telegram to the processing unit. The processing unit is embodied to process the unencrypted telegram on the fly.

The network subscribers in the automation network may be embodied in the form of a master-slave structure, meaning a logical or hierarchical structure of the subscribers. A transmission channel is usually available for transmitting data via the data line network in the automation network. The subscribers must share this channel by mutual agreement. In this case, the master subscriber is the subscriber that has the unsolicited access authorization to the transmission channel and may grant the slave subscriber authorization for it. The proposed method offers the possibility of the usual processing of the telegrams by the processing unit of a slave subscriber in pass-through. In this context, the term in pass-through is understood to mean that the processing unit is embodied to start processing the telegram before the telegram has been completely received via the input port of a slave subscriber.

Thus, the processing takes place in parallel to the continuous receipt of the telegram via the input port. In addition to the known processing of the telegrams in pass-through, which are preferably EtherCAT telegrams, the proposed method offers in each case the possibility of decrypting a telegram, which has been at least partially encrypted by the master subscriber via the decryption unit in pass-through. Also for decryption, it is not necessary for the slave subscriber to have received the at least partially encrypted telegram completely and then to start decryption. Instead, with this method, decryption may advantageously be performed in parallel with the continuous receipt of an at least partially encrypted telegram. This may minimize delay times and help to avoid unnecessarily extending the pass-through time of such a said telegram through a slave subscriber.

To encrypt the telegrams, the master subscriber may have a master-subscriber-encryption unit which may e.g. be embodied as a software module or as a combined hardware and software module. The master subscriber may at least partially encrypt the telegrams and flexibly adapt the at least partial encryption to the slave subscribers in the automation network. In the case of one and/or a plurality of network distributors arranged between the master subscriber and the slave subscriber or subscribers, the master subscriber may e.g. leave an Ethernet header section of a telegram unencrypted so that the network distributors may correctly evaluate the Ethernet header section for forwarding a telegram via the corresponding port of the network distributor.

If the master subscriber may at least partially encrypt the telegrams relevant for the control operation, e.g. the control data for the machines or systems within a telegram or, when forming an EtherCAT telegram, also within a datagram or within several datagrams, this may protect against unauthorized accesses into the control operation of the automation network and against manipulations in an advantageous way. In the following, an at least partially encrypted telegram is understood to be a telegram in which an Ethernet data section is encrypted, or in which at least one datagram of an EtherCAT telegram in the Ethernet data section is encrypted, or in which a datagram data section of at least one datagram of an EtherCAT telegram in the Ethernet data section is encrypted. Furthermore, the proposed method is also applicable to fully encrypted telegrams, i.e. telegrams in which the Ethernet header section together with the Ethernet data section and possibly the Ethernet end section is also encrypted.

In another embodiment, the at least one slave subscriber comprises an output port and an encryption unit, wherein the encryption unit is connected to the processing unit and to the output port.

The at least one slave subscriber is connected to a subsequent slave subscriber via the output port via a data line network. The processing unit is embodied to forward the decrypted portion of the at least partially encrypted telegram to the encryption unit. The encryption unit is embodied to encrypt the decrypted portion of the at least partially encrypted telegram with the key in a pass-through and to forward it to the output port. A first processor chip of the slave subscriber comprises the receiving logic, the processing unit, the decryption unit and the encryption unit.

The proposed method offers the advantage that not only the decryption of the encrypted portion of the telegram at least partially encrypted by the master subscriber as well as the processing of the part of the telegram decrypted by the decryption unit may each be performed in pass-through, but also the encryption of the decrypted portion of the telegram itself may be carried out. In particular, encryption by the encryption unit may be provided if the data in the telegram or in the datagram in case of an EtherCAT telegram has been modified during processing by the processing unit. In this way it may be ensured that sensitive data may also be securely transmitted for transmission to the subsequent slave subscriber via the data line network.

The subsequent slave subscriber may proceed in a similar manner for decryption of the telegram at least partially encrypted by the preceding slave subscriber with the key as described in connection with decryption of the telegram from the preceding slave subscriber at least partially encrypted by the master subscriber. The decryption and encryption in pass-through is not limited to one slave subscriber, but may be implemented by all slave subscribers in the automation network.

In a further embodiment, the receiving logic is embodied to generate a first version and a second version of an at least partially encrypted telegram by duplicating the at least partially encrypted telegram. The receiving logic is embodied to forward the first version to the decryption unit and the second version to the processing unit. The processing unit is embodied to process an unencrypted portion of the second version in pass-through and forward it to the output port. Furthermore, the processing unit is embodied to stop forwarding the second version to the output port at the position of the encrypted portion of the second version, provided that the encrypted part comprises a telegram section with write access for the processing unit.

Furthermore, the processing unit is embodied to perform a write access for the portion of the first version decrypted by the decryption unit and forwarded to the processing unit, and thus to process this portion of the first version in a pass-through and then forward it to the encryption unit for encryption. The encryption unit is embodied to encrypt the decrypted portion of the first version in pass-through and forward it to the output port. Provided that the encrypted portion of the second version had a telegram section with a write access for the processing unit, the processed portion of the unencrypted portion of the second version is connected to the encrypted portion of the first version before output via the output port.

Duplication of the at least partially encrypted telegram by the receiving logic may contribute to optimum use of the pass-through time of a telegram at least partially encrypted by the slave subscriber. The first version and the second version of the at least partially encrypted telegram duplicated by the receiving logic may be identical. The second version, which is instantaneously forwarded to the processing unit by the receiving logic may be processed in pass-through by the processing unit, provided that it is an unencrypted portion of the second version, wherein the processing in pass-through may thereby be embodied in the form of a write access or a read access, which is described below in connection with the encrypted portion of the first version, and applies equally to the unencrypted portion of the second version.

The processing unit may forward the unencrypted portion to the output port for output to the subsequent slave subscriber after processing has been completed in pass-through. The processing unit stops forwarding the second version to the output port at the location of an encrypted portion of the second version. Since the first version and the second version are duplicates, the first version also comprises the encrypted portion at the same location. The decryption unit of the first processor chip may decrypt the encrypted portion of the first version with the key, provided that a predetermined length in bytes, referred to as data block size, is buffered in a memory unit of the decryption unit, and forward it to the processing unit for evaluation. In this case, the evaluation may e.g. include a check of the addressing of the slave subscriber. For example, if it is an encrypted datagram data header section of a process data datagram or register datagram in an EtherCAT telegram, which will be explained below.

The addressing check may e.g. be performed by evaluating a command field, an address field, and a second length field in the datagram data header section. In particular, by evaluating the command field of the first version, the processing unit may e.g. determine how the data in the datagram data section is to be processed, i.e. by which access type. If the respective datagram is embodied with a write access in the command field in the datagram header section, i.e. the datagram is embodied as a so-called write datagram, the processing unit is usually to exchange data with a data memory of the slave subscriber, wherein the data memory may e.g. be part of the first processor chip and/or a second processor chip of the slave subscriber. Preferably, the processing unit stops forwarding the second version at the location of the encrypted portion of the second version when write access is detected in the decrypted part, and then performs the write access, i.e. the data exchange or data modification with the decrypted portion of the first version.

During data exchange or data modification, respectively, the data may be transferred from the data memory of the slave subscriber to the encryption unit so that it may encrypt them and insert them into the telegram at the appropriate location or position. The encoding unit may require time to encode and insert the data into the telegram, wherein the time needed may be equated with a number of unused bytes or so-called filler bytes that may be located between the datagram header section and the datagram data section in the Ethernet data section of a telegram. The unused bytes or filler bytes are only necessary for encryption, but not for decryption, since the memory unit of the decryption unit is filled with telegram bytes of an at least partially encrypted telegram at the same transmission rate as the throughput rate of an at least partially encrypted telegram is embodied by the slave subscriber. In principle, the decrypting unit may start decryption only after receiving, i.e. temporarily storing, the predetermined length in bytes, i.e. the data block size of the encrypted portion of the first version in the memory unit. This feature applies equally to the encryption unit and an encryption-unit-memory unit that may comprise the encryption unit.

However, different scenarios are conceivable for the encryption unit and the encryption-unit-memory unit with regard to speed or transmission rate. For example, the data of the data memory of the slave subscriber may be provided via different interfaces and this may be done with a higher transmission rate than the throughput speed of the at least partially encrypted telegram, i.e. a data stream of bytes, is embodied by the slave subscriber. Furthermore, it is conceivable that the data may be provided via the different interfaces at different transmission rates, respectively.

In a third scenario, e.g. the slave subscriber may comprise an exemplary address of 10,000 in the address field of the datagram header section and be addressed for position 10,016, and the data in a datagram data section may have a length of 32 bytes in the second address field. The encryption may have been done with an exemplary data block size of 16 bytes and the slave subscriber may e.g. be embodied to insert 8 bytes of data into the datagram. If the data in the datagram data section has a length or size of 32 bytes, the first 16 bytes may e.g. be intended for one and/or a plurality of other slave subscribers, while the slave subscriber itself may modify the first 8 bytes of the second 16 bytes (because of the above-mentioned addressing of the slave subscriber for position 10,016), whereas the slave subscriber may e.g. not be embodied for modifying the data for the second 8 bytes of the second 16 bytes.

In the mentioned example, the data for the first 8 bytes that the slave subscriber is allowed to modify could be provided via the interfaces mentioned above for the encryption unit or the encryption-unit-memory unit, while the second 8 bytes in the encryption-unit-memory unit may have been received by the slave subscriber via the input port and forwarded to the decryption unit for decryption via the receiving logic. Since the decryption unit cannot perform the decryption of the data until 16 bytes are received or buffered (i.e., showing the data block size) in the memory unit, and the encryption unit cannot perform the encryption of the data until 16 bytes are received or buffered in the encryption-unit-memory unit, it is therefore necessary in the third scenario to buffer the second 8 bytes in the memory unit of the decryption unit and in the encryption-unit-memory unit, respectively, until the required data block size is received. Accordingly, the number of unused bytes or filler bytes should correspond to the data block size in order to advantageously avoid that a telegram leads to a delay per slave subscriber when passing through the slave subscribers, which may be caused by an action to be executed by the slave subscriber.

To ensure that only a duplicate of the at least partially encrypted telegram is forwarded to the subsequent slave subscriber via the output port of the slave subscriber, the processing unit discards a remaining part of the second version subsequent to the location of the encrypted part and instead forwards a remaining part of the first version subsequent to the location of the encrypted part to the encryption unit of the first processor chip for encryption. The encryption unit may also, like the decryption unit of the first processor chip, have a memory unit, e.g. the above-mentioned encryption-unit-memory unit, in order to not start encryption until the required data block size of the telegram section to be encrypted is buffered in the encryption-unit-memory unit. The encryption unit of the first processor chip forwards the encrypted telegram section to the output port. To ensure that the unencrypted portion of the two duplicates is not then sent twice, the processing unit must e.g. discard the unencrypted portion of the first version if the processing unit has already forwarded the unencrypted portion of the second version.

The joining of the individual telegram sections prior to output via the output port, i.e. the joining of the unencrypted portion of the second version as well as the part of the first version that is re-encrypted after processing of the decrypted portion of the first version and the remaining part of the telegram following the encrypted portion of the first version, may be performed by a component of the first processor chip arranged between the processing unit and the output port. Alternatively, the output port may itself comprise said component connecting the telegram sections to the subsequent slave subscriber prior to output. Additionally, it is conceivable that said component is integrated in the processing unit and the encryption unit then forwards an encrypted portion of the telegram back to the processing unit.

According to a further embodiment, the receiving logic is embodied to generate a first version and a second version of an at least partially encrypted telegram by duplicating the at least partially encrypted telegram. The receiving logic is embodied to forward the first version to the decryption unit and the second version to the processing unit. The processing unit is embodied to process an unencrypted portion of the second version on the fly, wherein the on-the-fly processing may comprise a write access or a read access, and to pass it on to the output port. Moreover, provided that the encrypted portion of the second version includes a read access for the processing unit, the processing unit is embodied to forward the encrypted portion of the second version to the output port and to perform the read access for the portion of the first version decrypted by the decryption unit and forwarded to the processing unit, thereby processing this portion of the first version in passing. Provided that the encrypted portion of the second version had a telegram section with read access for the processing unit, the processed part of the unencrypted portion of the second version is connected to the encrypted portion of the second version before being output via the output port.

In addition to a write datagram, a datagram may also be embodied as a so-called read datagram with a read access to the data memory of the slave subscriber. When defining the decrypted portion of the first version as a read datagram with read access, the processing unit may execute the read access with the decrypted portion of the first version in parallel with the forwarding of the second version. The processing unit may discard the decrypted portion of the first version as well as the remaining portion of the first version following the decrypted part, so that in this case only the second version is forwarded to the output port. The joining of the telegram sections before being output via the output port, i.e. the unencrypted portion of the second version and the encrypted portion of the second version as well as the remaining part of the second version may thereby be executed by a component in a manner similar to the above description, therefore reference is made to the above description.

By duplicating an at least partially encrypted telegram, a faster data transmission may be achieved overall than without duplicating an at least partially encrypted telegram, since no additional pass-through delay time is added by the slave subscriber resulting from a hardware throughput time, i.e. the usual pass-through time of the individual slave subscriber for processing a telegram in passing. This positive effect of fast data transmission also applies to the embodiment explained above in connection with the write access. For the above explanation, it has also been assumed that the decryption unit and the encryption unit of the slave subscriber have the matching key by which the master subscriber at least partially encrypts the telegrams.

According to a further embodiment, the receiving logic is embodied to generate a first version and a second version of an at least partially encrypted telegram by duplicating the at least partially encrypted telegram. The receiving logic is embodied to forward the first version to the decryption unit and the second version to the processing unit. The processing unit is embodied to process an unencrypted portion of the second version on the fly, wherein the on-the-fly processing may comprise a write access or a read access, and to pass it on to the output port. If an encrypted portion of the second version does not comprise a write access for the processing unit and a read access for the processing unit, the processing unit is embodied to forward the encrypted portion of the second version to the output port. Provided that the encrypted portion of the second version had no telegram section with a write access for the processing unit and no telegram section with a read access for the processing unit, the processed part of the unencrypted portion of the second version is connected to the encrypted portion of the second version before being output via the output port.

In order to connect the mentioned telegram sections prior to the output via the output port, reference is made to the above description. In the mentioned embodiment the first version may be discarded by the processing unit and only the second version may be forwarded to the following slave subscriber via the output port. An unencrypted portion of the telegram with a write access does not necessarily require encryption before being output to the subsequent slave subscriber, despite the change of data, and contributes to minimizing the delay of the telegram when passing through the slave subscriber.

Depending on the embodiment, unencrypted parts of the first and/or second versions may also be forwarded to the encryption unit for encryption after processing on the fly by the processing unit. The encryption unit then forwards the portions to the output port after encryption has taken place.

In a further embodiment, the telegrams embodied as Ethernet telegrams and each comprise an Ethernet header section with a first data field and an Ethernet data section. In a first encryption method, the master subscriber is embodied to encrypt the Ethernet data section of an Ethernet telegram with the key and the encryption of the Ethernet data section is indicated by the master subscriber having a first telegram identifier in the first data field in the Ethernet header section. The receiving logic of the at least one slave subscriber is embodied to evaluate the first telegram identifier in the Ethernet header section.

The telegrams may each be embodied as Ethernet telegrams. If the first data field in the Ethernet header section is e.g. embodied as a protocol field (Ethertype), the first telegram identifier may correspond to a previously unused value of the protocol field. The protocol field provides information about the used protocol of the next higher layer within the user data, wherein a layer and a next higher layer are defined according to the OSI model (OSI: Open Systems Interconnection), i.e. the reference model for data transmission protocols in a layered architecture. This value may differ from the known values for the VLAN Tag (VLAN: Virtual Local Area Network) with 0x8100 (in hexadecimal system), the UDP/IP protocol (UDP/IP: User Datagram Protocol/Internet Protocol) with 0x0800 (in hexadecimal system) or the EtherCAT protocol 0x88A4 (in hexadecimal system) and correspond to a new value. The value may indicate to the receiving logic that the Ethernet data section in the first encryption method has been completely encrypted by the master subscriber.

According to a further embodiment, the telegrams are embodied as Ethernet telegrams and each comprise an Ethernet header section and an Ethernet data section, the Ethernet data section comprising a further header section and datagrams. The further header section may be embodied as an EtherCAT header section and have a second data field. In the second encryption method, the master subscriber is embodied to encrypt at least one datagram with the key and the encryption of the at least one datagram is indicated by the master subscriber with a second telegram identifier in the second data field of the EtherCAT head section. The receiving logic of the at least one slave subscriber is embodied to evaluate the second telegram identifier in the further header section.

The second telegram identifier in the second data field may correspond to a previously unused value of the type field if the second data field for an EtherCAT telegram is embodied as an EtherCAT type field. The type field may comprise 4 bits, i.e. 16 ($2^4$=16) different values. The value 0x1 (in the hexadecimal system) of the EtherCAT type field is already reserved and indicates to the processing unit that processing is enabled. Since it is also possible to block the processing of an EtherCAT telegram via an already reserved value of the EtherCAT type field, the value of the second telegram identifier for indicating the encryption of the EtherCAT section comprising at least one datagram must be different from this. In addition to the second telegram identifier, the encryption of the at least one datagram also requires additional information that indicates to the receiving logic and the decryption unit of the slave subscriber whether the master subscriber has encrypted individual datagrams or all datagrams. For example, this additional information may be accommodated in the further header section, which is preferably embodied as an EtherCAT header section, in a first reserve field that does not comprise any information so far. The additional information may be evaluated by the receiving logic or the decryption unit.

In a further embodiment, the telegrams are embodied as Ethernet telegrams and each have an Ethernet header section and an Ethernet data section, wherein the Ethernet data section comprises a further header section, which may be embodied as an EtherCAT header section, and datagrams. The datagrams each comprise a datagram header section having a third data field and a datagram data section. In a third encryption method, the master subscriber is embodied to encrypt the datagram data section of at least one datagram with the key and the encryption of the datagram data section of at least one datagram is indicated by the master subscriber with a third telegram identifier in the third data field of the datagram header section. The receiving logic of the at least one slave subscriber is embodied to evaluate the third telegram identifier in the datagram header section.

Furthermore, with the proposed method in combination with the proposed telegram formation, it is also possible for the master subscriber to encrypt only parts of at least one datagram, i.e. the datagram data section in each case. The master subscriber indicates the encryption of the datagram data section in the third encryption method via the third telegram identifier in the third data field of the datagram header section. This may be interpreted by the receiving logic or the decryption unit of a slave subscriber. In particular, the third data field of the datagram header section may be embodied as a further reserve data field and may e.g. be unused so far. For example, the further reserve data field in the datagram header section may comprise 3 bits, wherein 8 different values may thus be represented. The master subscriber may therefore flexibly set the encryption for the slave subscribers using the encryption methods shown.

According to a further embodiment, the datagrams of the Ethernet data section are each embodied as process-data datagrams and/or as mailbox datagrams and/or as register datagrams. Process-data datagrams may conversely be intended for several slave subscribers, while mailbox datagrams may e.g. be intended for a single slave subscriber. Register datagrams may be intended for one or for several slave subscribers. If the known EtherCAT standard is used to form the telegrams that are output by the master subscriber to the slave subscriber(s), an EtherCAT telegram may have different datagram types in each case. In particular, process-data datagrams as well as register datagrams may comprise data or information relevant for the control of the automation network, while mailbox datagrams are e.g. not processed by a first protocol chip of the processing unit, which is e.g. embodied as an EtherCAT slave controller.

It is conceivable that the aforementioned datagrams are all encrypted differently from each other by the master subscriber. If the individual datagram types are all encrypted differently, it is particularly conceivable that a slave subscriber comprises several decryption units or encryption units in each case. For example, a separate decryption unit and encryption unit may be provided for each datagram type in the slave subscriber, wherein the slave subscriber may then receive a separate key from the master subscriber for each datagram type. Moreover, it is also conceivable that a separate key for decrypting the datagrams is issued by the master subscriber for each datagram type for each slave subscriber. In addition, it is conceivable that all slave subscribers receive the same key from the master subscriber.

In a further embodiment, the master subscriber is embodied to define a time window in which the master subscriber outputs at least partially encrypted telegrams to the at least one slave subscriber. The receiving logic is embodied to forward the at least partially encrypted telegram to the decryption unit for decryption in the specified time window. Here, a telegram encrypted by the master subscriber may in particular be completely encrypted. In this context, completely may also include the Ethernet header section. If a network distributor is provided in the automation network, it cannot evaluate the information for forwarding the telegram due to the encrypted Ethernet header section, unless the network distributor has a key for decrypting the telegram. However, the network distributor may receive a key from the master subscriber or may be set so that the network distributor generally outputs telegrams, the Ethernet header section of which is not to be evaluated, via a specific port. Of course, the master subscriber may also encrypt only portions of a telegram and output these telegrams to the slave subscriber in the specified time window. Due to the time window defined by the master subscriber, the receiving logic may in the slave subscriber internally forward telegrams for decryption faster.

According to a further embodiment, the master subscriber is embodied to output a switch-over telegram to the at least one slave subscriber before sending the at least partially encrypted telegrams. The receiving logic is embodied to forward the at least partially encrypted telegram to the decryption unit for decryption after receipt of the switch-over telegram. For this variant of the proposed method, as well, the master subscriber may fully encrypt the telegrams in each case, i.e. including the Ethernet header section, as explained above. The switch-over telegram may e.g. also be embodied as an EtherCAT telegram if the telegram traffic is also based on EtherCAT telegrams in control mode.

In a further embodiment, the receiving logic is embodied to distinguish telegrams at least partially encrypted by the master subscriber and telegrams unencrypted by the master subscriber based on a formation of the telegrams in which a header section of each of the at least partially encrypted telegrams differs from a header section of each of the unencrypted telegrams. For example, the master subscriber may accordingly mark a preamble, i.e. a section located at the first position in the Ethernet header section of an at least partially encrypted telegram, and set the receiving logic with the marking so that it forwards an at least partially encrypted telegram with a recognized marking, e.g. exclusively to the decryption unit in a first setting. A deviating marking of the preamble and setting of the receiving logic may e.g. lead to the generation of a first version and a second version of an at least partially encrypted telegram by duplicating the at least partially encrypted telegram in a second setting of the receiving logic.

Here, the receiving logic may e.g. forward the first version to the decryption unit and the second version to the processing unit. Furthermore, the master subscriber may embody the preamble of an unencrypted telegram differently from the preamble of the first setting of the receiving logic or differently from the second setting of the receiving logic or differently from the formation of the preamble of an at least partially encrypted telegram. Alternatively, it is also conceivable that the master subscriber does not make the distinction between the variants mentioned on the basis of the different formations of the preamble in the Ethernet header section of the telegrams, but for example in another data field in the Ethernet header section. Via a distinguishing feature in the Ethernet header section, the receiving logic may make an earliest possible decision for forwarding or duplicating a telegram, since the receiving logic evaluates the Ethernet header section first.

According to the invention, a slave subscriber for an automation network is furthermore proposed. The slave subscriber comprises a first processor chip and a second processor chip, the first processor chip comprising the processing unit. The first processor chip is embodied as an EtherCAT slave controller and the second processor chip is embodied as a microcontroller. The EtherCAT slave controller comprises an interface and is connected to the microcontroller via the interface. The master subscriber is embodied to establish the trusted connection to the interface of the EtherCAT slave controller of the slave subscriber, in each case in order to encrypt the key, by which the master subscriber at least partially encrypts the telegrams, with the encryption protocol and to transmit it to the EtherCAT slave controller of the slave subscriber via the trusted connection. The EtherCAT slave controller is embodied to forward the key encrypted with the encryption protocol to the microcontroller via the interface. The microcontroller is embodied to decrypt the key encrypted with the encryption protocol by the master subscriber and to forward the key to the decryption unit and to the encryption unit.

In the following, the decryption unit and the encryption unit are understood to be the decryption unit and the encryption unit that the first processor chip, i.e. the EtherCAT slave controller, comprises. Preferably, the first processor chip comprises the decryption unit and encryption unit for process data datagrams and register datagrams. In particular, said decryption unit and encryption unit of the first processor chip may be provided for decrypting and/or encrypting process data datagrams and register datagrams. Furthermore, said second processor chip may also comprise a further decryption unit and a further encryption unit, wherein said further decryption unit and said further encryption unit are particularly provided for decrypting and encrypting mailbox datagrams. Also, the further decryption unit of the second processor chip may be provided for decrypting the secret key transmitted from the master subscriber to the slave subscriber so that the slave subscriber may again decrypt the telegrams at least partially encrypted by the master subscriber with the key.

The secret key by which the master subscriber at least partially encrypts the telegrams in each case is transmitted by the master subscriber to the slave subscriber via a trusted connection before the at least partially encrypted telegrams are sent. To obtain the trusted connection, the master subscriber first establishes a connection to the slave subscriber. Once the master subscriber and the slave subscriber have been authenticated, e.g. by certificates, the two connection partners may be classified as trustworthy. Data may then be transmitted over the trusted connection in encrypted form using an encryption protocol. The encryption used for the trusted connection may be embodied as point-to-point encryption, i.e. in each case the partial path between the master subscriber and the slave subscriber may be encrypted.

The encrypted transfer of data may e.g. be realized by the TLS protocol (TLS: Transport Layer Security) via mailbox datagrams of an EtherCAT telegram. For example, a mailbox datagram may respectively include a key that may be transmitted to the slave subscriber in encrypted form using the TLS protocol. The first processor chip of a slave subscriber in an EtherCAT network, i.e. in an automation network in which the telegram traffic is based on the EtherCAT standard, may e.g. be embodied in such a way that the first processor chip cannot process or decrypt the mailbox datagram encrypted with the TLS protocol. However, mailbox datagrams are transmitted from the first processor chip to the second processor chip, i.e. the microcontroller, via the first interface for processing or decrypting.

The microcontroller may e.g. decrypt the mailbox datagram of an EtherCAT telegram encrypted with the TLS protocol with the further decryption unit to obtain the secret key of the master subscriber and may further be embodied to internally forward the secret key to the decryption unit or the encryption unit of the first processor chip. The decryption unit and/or the encryption unit of the first processor chip may e.g. each store the key in a special register that is embodied to be unreadable, so that no other subscribers of the automation network or other internal components of the slave subscriber may access it, but only the decryption and/or encryption unit of the first processor chip itself for decrypting and/or encrypting. Thus, the secret key in the slave subscriber itself is not "visible" from the outside. In this way, the confidentiality of data transmission by telegrams may be improved in an advantageous manner. The processing unit may be implemented as a software module, as a hardware module and equally also as a combined hardware and software module.

In a further embodiment, the decryption unit of the first processor chip of the slave subscriber comprises a memory unit that is connected to the receiving logic. The decryption unit is embodied to buffer the encrypted portion of the telegram at least partially encrypted by the master subscriber in the memory unit until the encrypted portion of the at least partially encrypted telegram corresponds to a predetermined length in bytes. The predetermined length in bytes corresponds to a data block size by which the master subscriber encrypts respective data blocks of a telegram. Advantageously, a telegram at least partially encrypted by the master subscriber does not first have to be received in full by the respective slave subscriber and may not be decrypted until subsequently, but may be decrypted by the decryption unit of the first processor chip on the fly, i.e. in parallel to the continuous receipt via the input port of the slave subscriber.

For this purpose, the decryption unit of the first processor chip only has to delay the at least partially encrypted telegram slightly in the memory unit of the decryption unit, i.e. buffer it, until the received part of the telegram at least partially encrypted by the master subscriber corresponds to the specified length in bytes, i.e. the data block size by which the master subscriber encrypts data blocks of a telegram.

The delay of the received portion of the at least partially encrypted telegram in the memory unit of the decryption unit of the first processor chip may thereby be calculated in an advantageous manner.

According to a further embodiment, the decryption unit of the first processor chip is embodied, when at least the predetermined length in bytes of the encrypted portion of the at least partially encrypted telegram has been buffered in the memory unit, to decrypt the encrypted portion of the at least partially encrypted telegram. This does not require complete receipt of the at least partially encrypted telegram prior to decryption. The proposed method may therefore still ensure short pass-through times of the telegrams by the individual slave subscribers despite the encryption used.

In a further embodiment, the encryption unit comprises an encryption-unit-memory unit connected to the output port. The encryption unit of the first processor chip is embodied to buffer the decrypted portion of the at least partially encrypted telegram in the encryption-unit-memory unit until the decrypted portion of the at least partially encrypted telegram corresponds to the predetermined length in bytes. Furthermore, the encryption unit is embodied to encrypt the decrypted portion of the at least partially encrypted telegram provided that the decrypted portion of the at least partially encrypted telegram in the encryption-unit-memory unit is at least equal to the predetermined length in bytes, i.e., the data block size. The encryption-unit-memory unit may advantageously be embodied similarly to the memory unit of the decryption unit of the first processor chip. Both components may each be integrated into the decryption unit or into the encryption unit, or may be embodied as separate components. In particular, the encryption-unit-memory unit comprises the above-mentioned advantages for the decryption unit memory unit.

The advantageous embodiments and further developments of the invention explained above and/or indicated in the dependent may be used individually or in any combination with one another—except, for example, in cases of clear dependencies or incompatible alternatives.

BRIEF DESCRIPTION OF THE DRAWINGS

The above-described properties, features and advantages of the present invention, as well as the manner in which they are achieved, will become clearer and more clearly understood in connection with the following description of embodiments, which will be explained in more detail in connection with the schematic drawings, in which:

FIG. 5 shows a schematic structure of a data structure for use in a method in the automation network.

DETAILED DESCRIPTION

Figure 1:
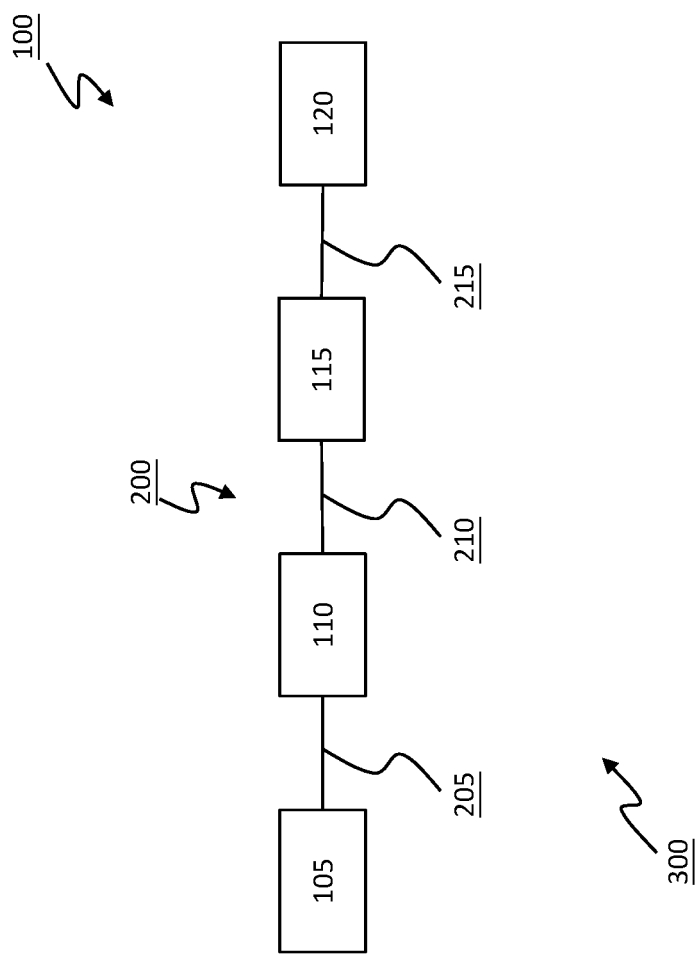
FIG. 1 shows a schematic structure of an automation network having network subscribers.

It should be noted that the figures are merely schematic and not to scale. Correspondingly, components and elements shown in the figures may be exaggeratedly large or reduced in size for better understanding. Furthermore, it is pointed out that the reference signs in the figures have been chosen to be unchanged if the elements and/or components are of the same design.

Automation networks 100 are usually implemented as field-bus systems in which the network subscribers 300 are networked with one another via the field bus. The network subscribers 300 may be embodied as at least one master subscriber 105 and at least one slave subscriber 110. Said network subscribers 300 may be embodied to exchange data with control units, with real-time capable data transfer protocols such as the EtherCAT data transfer protocol generally being used for this purpose. In the following, the invention is described by way of example using the real-time capable EtherCAT data transmission protocol.

The core idea of the present invention is to provide of a method which makes it possible to decrypt at least partially encrypted telegrams which may comprise information or data relevant for the control operation of the automation network 100 in parallel with the continuous receipt, i.e., in throughput, and to process the decrypted portion of the telegrams on the fly in each case. An automation network 100 developed for this purpose, as well as a master subscriber 105 developed for this purpose and a slave subscriber 110 developed for this purpose serve to implement the proposed method and to process at least partially encrypted telegrams.

Here, the invention is not limited to the use of the EtherCAT data transmission protocol, even though this is the preferred data transmission protocol, but may be used in all automation networks 100 in which at least partially encrypted telegrams from a master subscriber 105 are to be decrypted in passing for processing by the slave subscribers 110.

The structure and functionality of the automation network 100 according to the invention is described below with reference to FIGS. 1 to 5, with the associated reference numerals from the five figures being used in the description where useful and necessary.

FIG. 1 shows a schematic structure of an automation network 100 comprising network subscribers 300 which is embodied for a method for processing telegrams in the automation network 100. The automation network 100 comprises a plurality of network subscribers 300 which are interconnected via a data line network 200. At least one network subscriber 300 of the automation network 100 is configured as a master subscriber 105, and at least one network subscriber 300 of the automation network 100 is configured as a slave subscriber 110. The network subscribers 300 of the automation network 100 are thus embodied as a master-slave structure. The master-slave structure thereby images the access hierarchy to the data line network 200, i.e. the master subscriber 105 has access authorization to the data line network 200 and may grant access to the slave subscribers 110 in the automation network 100, respectively.

The master subscriber 105 is connected to the slave subscriber 110 via a first data line 205. The slave subscriber 110 may be connected to a first additional slave subscriber 115 via a second data line 210. The first further slave subscriber 115 may be connected to a second further slave subscriber 120 via a third data line 215. The depictions of the network subscribers 300 and the first to third data lines 205, 210, 215 have been chosen by way of example and do not limit the invention thereto. Also, for simplicity, no input/output ports of the individual network subscribers 300 have been depicted, nevertheless these network subscribers 300 have input/output ports for receiving and forwarding telegrams. Also, the automation network 100 in FIG. 1 could have further network subscribers 300. These may be further slave subscribers 110 and/or one or a plurality of network distributors, wherein slave subscribers 110 may be connected to the ports of the one or of the plurality of network distributors via further data lines.

In the automation network 100 shown in FIG. 1, the slave subscriber 110 may be embodied to decrypt and process telegrams in a continuous manner that are at least partially encrypted by the master subscriber 105 with a key. The slave subscriber 110 may be configured to decrypt the telegrams from the master subscriber 105 with the key in a decryption unit 415 in parallel with the continuous receipt of the telegram at least partially encrypted by the master subscriber 105.

The key by which the master subscriber 105 at least partially encrypts the telegrams and the key by which the slave subscriber 110 may decrypt the telegrams on the fly in each case, i.e. in parallel with the continuous receipt via an input port 400, may be symmetrical. This means that the master subscriber 105 and the slave subscriber 110 may each use the same key for encryption and decryption, and the encryption may thus be implemented in the form of symmetrical encryption. In addition, it is also conceivable that the keys may differ from one another and asymmetric encryption is implemented in the automation network 100, or it is also conceivable to use a hybrid method that combines symmetric encryption with asymmetric encryption in the automation network 100.

In addition to the on-the-fly decryption by the slave subscriber 110 of a telegram at least partially encrypted by the master subscriber 105, which may comprise data or information required for the control operation of the automation network 100, the slave subscriber 110 may also process the decrypted portion of the telegram in pass-through. In this regard, processing of a telegram, which is preferably in the form of an EtherCAT telegram relates to reading the output data of the telegram addressed to the slave subscriber 110 as well as to inserting input data into the telegram and forwarding it to the subsequent first further slave subscriber 115. In particular, an EtherCAT telegram may include an EtherCAT header section 525 and a plurality of datagrams in an Ethernet data section 510 of the telegram.

In turn, a datagram may be further divided into a datagram header section 590 and a datagram data section 595. Also, the plurality of datagrams may be formed differently. For example, an EtherCAT telegram may each comprise datagrams in the form of process data datagrams and/or register datagrams and/or mailbox datagrams. In particular, process data datagrams as well as register datagrams may thereby comprise data or information relevant for the control operation of the automation network 100 in their datagram data sections 595 which the master subscriber 105 may exchange with the slave subscribers in the automation network 100 in this way. The process data datagrams as well as the register datagrams may each be embodied with a write access, a read access or a combined write/read access. Thus, if in the following reference is made to telegrams at least partially encrypted by the master subscriber 105 or to EtherCAT telegrams, this always includes the aforementioned datagram types.

The first further slave subscriber 115 as well as the second further slave subscriber 120 may also be embodied similarly to the slave subscriber 110. In that case, the above description applies equally to the first further slave subscriber 115 as well as to the second further slave subscriber 120 and shall not be repeated here. The second further slave subscriber 120 may have been short-circuited with a switch via a further input/output port to which no subsequent network subscriber 300 is connected, so that the second further slave subscriber 120 is the last network subscriber 300 in the chain. Thereupon, the second further slave subscriber 120 sends a telegram received from the master subscriber 105 which is preferably embodied as an EtherCAT telegram and has previously passed through the slave subscriber 110 as well as the first further slave subscriber 115, back to the master subscriber 105 due to the further input/output port being short-circuited with the switch. A forward line as well as a return line comprise the data line network 200.

An EtherCAT network, i.e. an automation network 100 in which the telegram traffic is implemented with the underlying EtherCAT data transmission protocol, generally comprises a data line network 200 having data lines, each of which has an forward line for sending telegrams from the master subscriber 105 to the network subscribers 300 and a return line for receiving telegrams from the master subscriber 105 shown in FIG. 1. A network subscriber 300 in an EtherCAT network is embodied to process a telegram, preferably an EtherCAT telegram, on the forward line, i.e. to read the output data of the telegram addressed to the network subscriber 300 and to put the input data of the network subscriber 300 into the telegram. If the telegram has been at least partially encrypted by the master subscriber 105, the network subscriber 300 may first be embodied to decrypt the at least partially encrypted telegram on the fly in the decryption unit 415 prior to processing.

The telegrams are sent back in the EtherCAT network via the return line, and the network subscribers 300 do not process the telegrams via the return line. In particular, the last network subscriber 300 in the chain according to the above explanation may have decrypted the telegram received from the master subscriber 105 on the outward line and send it again encrypted via the return line to the master subscriber 105 via the further input/output port that is short-circuited with the switch with the return line. Alternatively, however, it is also conceivable for the network subscribers 300 to process the telegrams on the return line.

Figure 2:
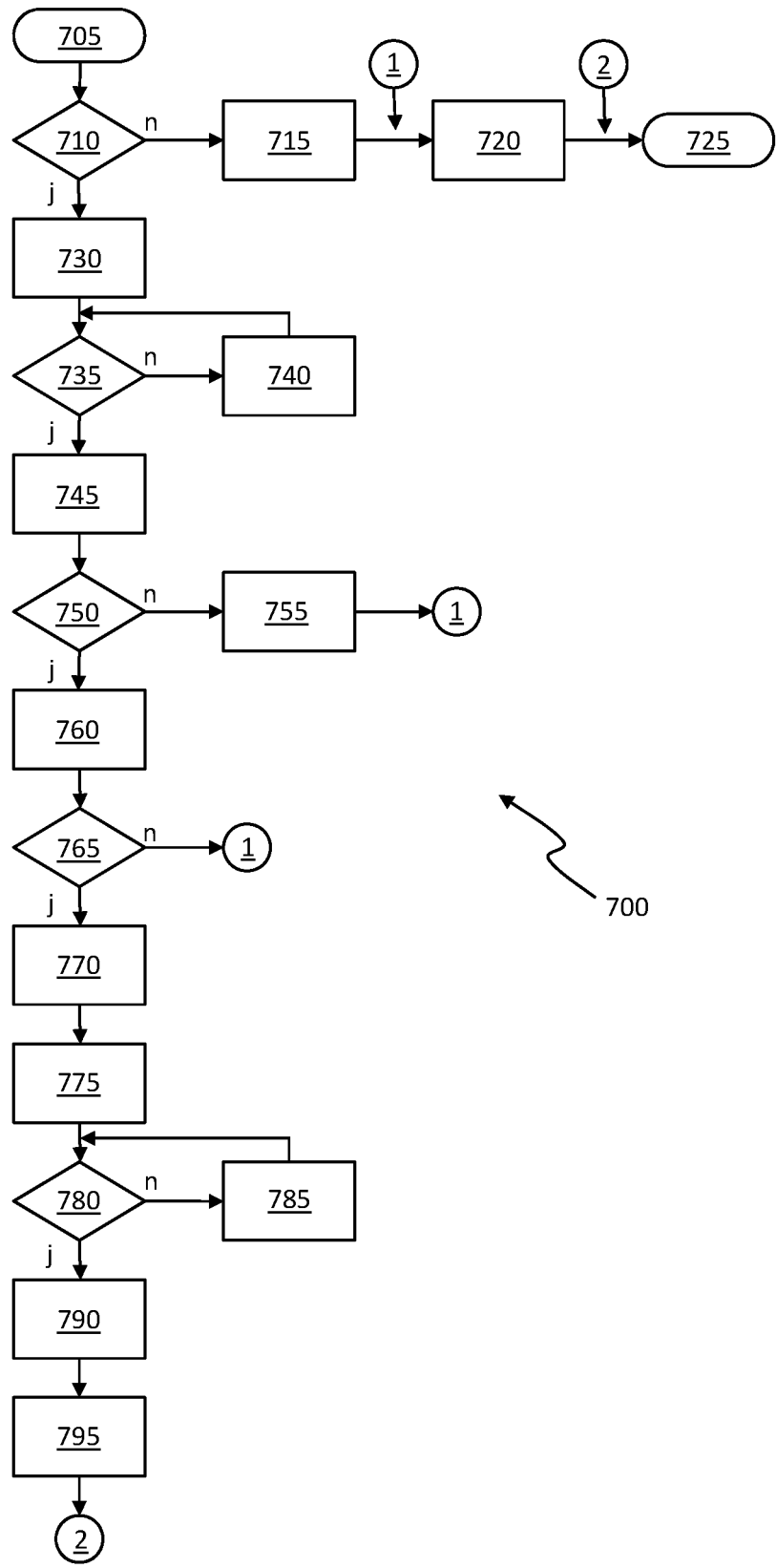
FIG. 2 is a first flow chart for a method of processing telegrams in the automation network according to a first embodiment.

FIG. 2 shows a first flowchart 700 of a method for processing telegrams in the automation network 100 shown in FIG. 1 according to a first embodiment. In the first embodiment of the method, a receiving logic 410 of the slave subscriber 110 in FIG. 4 e.g. comprises a first setting. The master subscriber 105 may output at least partially encrypted telegrams and/or unencrypted telegrams to the at least one slave subscriber 110. A first method step 705 in FIG. 2 represents the start of the method. The first method step 705, i.e. the start, may be equated with receiving an at least partially encrypted telegram via an input port 400 of the slave subscriber 110 and forwarding the at least partially encrypted telegram to the receiving logic 410. In a second method step 710, a branch is used to check whether the receiving logic 410 has the first setting. The first setting of the receiving logic 410 may mean that the receiving logic 410 exclusively forwards an at least partially encrypted telegram to a decryption unit 415 of the slave subscriber 110.

The first setting of the receiving logic 410 may be carried out by the master subscriber 105. For example, the master subscriber 105 may specify to the receiving logic 410 a time window for which the receiving logic 410 of slave subscriber 110 is embodied to forward at least partially encrypted telegrams exclusively to the decryption unit 415. Accordingly, in the first setting, the receiving logic 410 may act as a kind of switch configured to forward the at least partially encrypted telegrams to the decryption unit 415. Furthermore, prior to sending the at least partially encrypted telegrams, the master subscriber 105 may issue a switch telegram to the at least one slave subscriber 110 that the master subscriber 105 may use to configure the receiving logic 410 with the first setting.

Moreover, the master subscriber 105 may be configured to set the receiving logic 410 to recognize an at least partially encrypted telegram for the first setting of the receiving logic 410 based on an embodiment of a header section of the at least partially encrypted telegram and then to forward the at least partially encrypted telegram to the decryption unit 415. For example, the master subscriber 105 may appropriately define a preamble, i.e. a portion located at the first position in the header section of an at least partially encrypted telegram, and set the receiving logic 410 with the marking to exclusively forward an at least partially encrypted telegram with a recognized marking for the first setting to the decryption unit 415.

If the check in the second method step 710 shows that the receiving logic 410 does not have the first setting, which is indicated by the symbol n in the branching in the second method step 710, the telegram output by the master subscriber 105 is not embodied as an at least partially encrypted telegram, but as an unencrypted telegram that does not require decryption by the decryption unit 415. If the check result of the second method step 710 is negative, the receiving logic 410 forwards the unencrypted telegram in a third method step 715 to a processing unit 425 of the slave subscriber 110 for processing on the fly. The processing unit 425 forwards the unencrypted telegram to the output port 405 in a fourth method step 720, and the unencrypted telegram is output in a fifth method step 725, which also defines the end of the method, via the output port 405 of the slave subscriber 110 to the subsequent slave subscriber.

If, on the other hand, the check of the second method step 710 shows that the first setting of the receiving logic 410 is present, which is indicated by the symbol j, the receiving logic 410 forwards the at least partially encrypted telegram to the decryption unit 415 for decryption in a sixth method step 730. The sixth method step 730 further includes the decryption unit 415 temporarily storing an encrypted portion of the at least partially encrypted telegram in a memory unit 420 and forwarding only an unencrypted portion to the processing unit 425. In a seventh method step 735, the memory unit 420 of the decryption unit 415 checks in a branch whether the encrypted portion of the at least partially encrypted telegram buffered in the memory unit 420, corresponds to a data block size, i.e. the size of a data block of the telegram in bytes, which the master subscriber 105 uses for the encryption.

If the check of the seventh method step 735 shows that the encrypted portion of the at least partially encrypted telegram buffered in the memory unit 420 of the decryption unit 415 does not correspond to the data block size, the decryption unit 415 waits in an eighth method step 740 until the required minimum size in bytes corresponding to the data block size of the encrypted portion of the at least partially encrypted telegram are buffered in the memory unit 420. Therefore, the eighth method step 740 leads back to the branching, i.e. the seventh method step 735.

A positive test result of the seventh method step 735 is indicated by the symbol j and means that the memory unit 420 has the data block size, i.e. the required minimum size of the encrypted portion of the at least partially encrypted telegram. In the event of a positive test result, the seventh method step 735 leads, to the decryption unit 415 being embodied in a ninth method step 745 to decrypt the encrypted portion of the at least partially encrypted telegram in passing. Here, the decryption unit 415 may check in a branching in a tenth method step 750 whether the decryption unit 415 has a matching key by which the master subscriber 105 has at least partially encrypted the telegram.

If the check of the tenth method step 750 reveals that the key of the decryption unit 415 does not match, which is indicated by the symbol n, the decryption unit 415 forwards the encrypted portion of the at least partially encrypted telegram to the processing unit 425 in an eleventh method step 755. The processing unit 425 cannot process the encrypted portion of the at least partially encrypted telegram, therefore it may be embodied by the master subscriber 105 to forward the encrypted portion of the at least partially encrypted telegram to the output port 405 of the slave subscriber 110, corresponding to the fourth method step 720. Accordingly, after the eleventh method step 755, a jump is carried out via the first reference point 1 to the fourth method step 720. The fifth method step 725 may subsequently be carried out as described above with the encrypted portion of the at least partially encrypted telegram.

If the check of the tenth method step 750 has a positive result, which is indicated by the symbol j, the decryption unit 415 decrypts the encrypted portion of the at least partially encrypted telegram in a twelfth method step 760 on the fly with the matching key. Furthermore, the decryption unit 415 forwards the decrypted portion of the at least partially encrypted telegram to the processing unit 425 in the twelfth method step 760. The processing unit 425 then checks in a thirteenth method step 765 in a branch whether the slave subscriber 110 is addressed by the telegram. In the case of an EtherCAT telegram, this may e.g. be done by evaluating a datagram header section 590 in an Ethernet data section 510 of the telegram, i.e., by evaluating a command field 605 of an address field 615 and a second length field 620. However, the telegram structure will be discussed only in connection with the description of FIG. 5. If the slave subscriber 110 is not addressed, the method is continued with the fourth method step 720, i.e. the forwarding of the telegram to the output port 405, via the first reference point 1. Subsequently, the fifth method step 725 may be carried out as described above and the method may be terminated.

If the check carried out by the processing unit 425 in the thirteenth method step 765 has a positive result, i.e. the slave subscriber 110 is addressed with the telegram of the master subscriber 105, which is indicated by the symbol j, the processing unit 425 processes an unencrypted portion of the at least partially encrypted telegram in the same way as the decrypted portion of the at least partially encrypted telegram in a fourteenth method step 770. The processing of the telegram, which in the case of an EtherCAT telegram may have a plurality of datagrams in the Ethernet data section 510, by the processing unit 425 may, as the case may be, be accompanied by an exchange of data of the individual datagrams with the first interface 440, second interface 445 and third interface 450 shown in FIG. 4. This is particularly conceivable if a datagram with a write access is formed in the command field 605 of the datagram header section 590 to access a data memory of the slave subscriber, wherein the first processor chip 430 and/or the second processor chip 435 in FIG. 4 may have such a data memory.

After processing the decrypted portion of the at least partially encrypted telegram or the unencrypted portion of the at least partially encrypted telegram, the processing unit 425 forwards the decrypted portion of the at least partially encrypted telegram or the unencrypted portion of the at least partially encrypted telegram to an encryption unit 455 in a fifteenth method step 775. Similar to the decryption unit 415, the encryption unit 455 checks in a branching in the sixteenth method step 780 whether the data block size by which the master subscriber 105 has encrypted the data blocks of the telegram is buffered in an encryption-unit-memory unit 460. Similar to the eighth method step 740, a seventeenth method step 785 is also traced back to the sixteenth method step 780, provided that the check by the encryption-unit-memory unit 460 indicates that the data block size for the decrypted portion of the at least partially encrypted telegram buffered in the encryption-unit-memory unit 460 or the unencrypted portion of the at least partially encrypted telegram has not yet been reached, i.e. provided.

If the result of the check in the sixteenth process step 780 indicated by the symbol j is positive, the encryption unit 455 encrypts the entire telegram, i.e., the decrypted portion and the unencrypted portion of the at least partially encrypted telegram, in an eighteenth process step 790. Alternatively, in the eighteenth process step 790, the encryption unit may encrypt only that portion of the at least partially encrypted telegram which was already encrypted when the at least partially encrypted telegram was received and which has been decrypted by the decryption unit. Subsequently to the eighteenth method step 790, the encrypted telegram is forwarded to the output port 405 in a nineteenth method step 795. A jump to the fifth method step 725, the end of the method, is carried out via the second reference point 2, wherein in this case the encrypted telegram is output to the subsequent slave subscriber via the output port 405.

Figure 3:
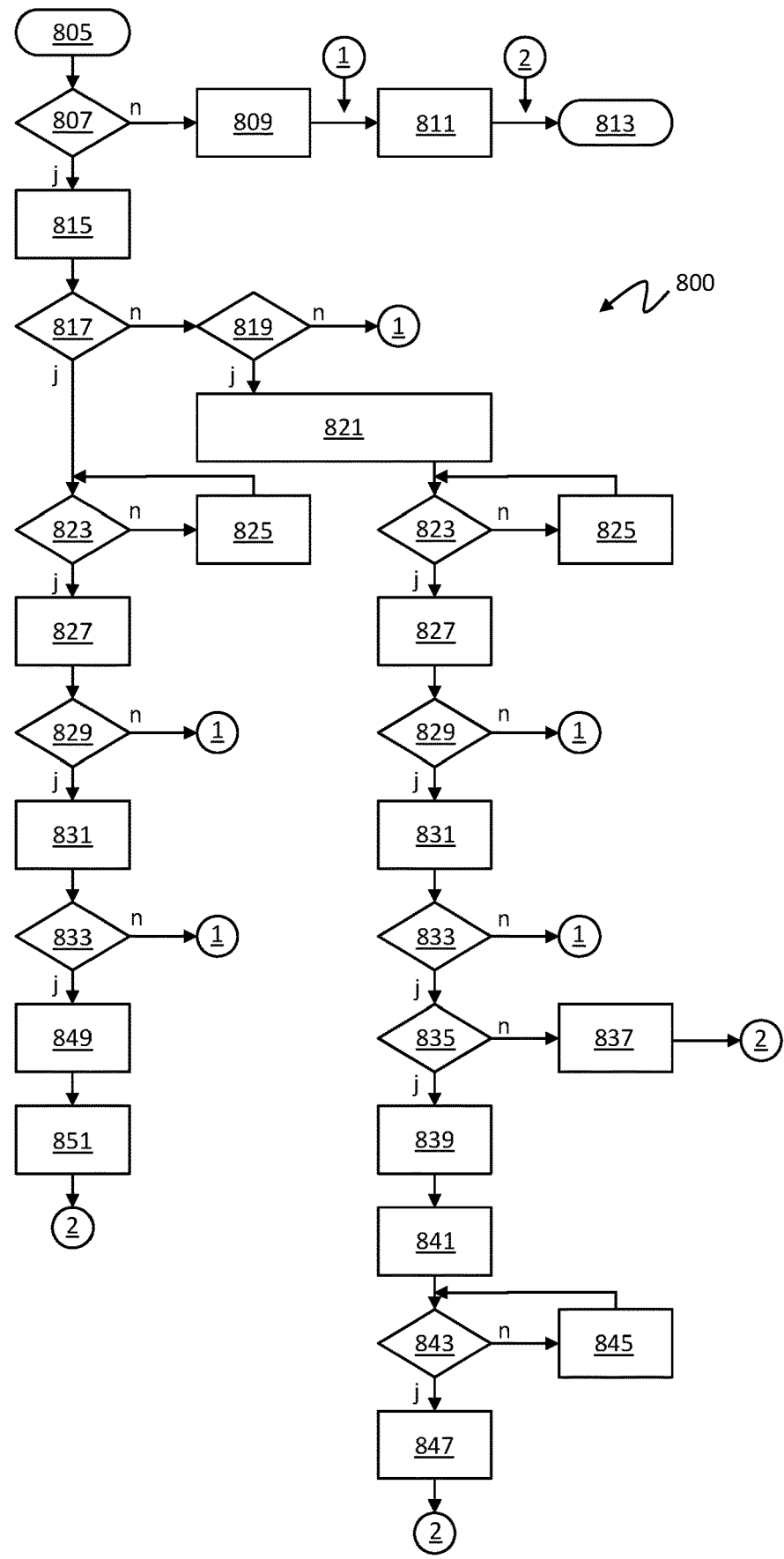
FIG. 3 is a second flow chart for a method of processing telegrams in the automation network according to a second embodiment.

FIG. 3 shows a second flowchart 800 of a method for processing telegrams in the automation network 100 shown in FIG. 1 according to a second embodiment. In the second embodiment, the receiving logic 410 may have a second setting. A first step 805 in the second flowchart 800 may be embodied similarly to the first method step 705 in the first flowchart 700 and may mark the start of the method, i.e. the receipt of an at least partially encrypted telegram from the master subscriber 105 via the input port 400 of the slave subscriber 110 and the forwarding of the at least partially encrypted telegram to the receiving logic 410. In a second step 807, a branch is used to check whether the receiving logic 410 has the second setting. In this context, the second setting of the receiving logic 410 may mean that the receiving logic 410 generates a first version and second version of an at least partially encrypted telegram by duplicating an at least partially encrypted telegram. Preferably, the first version and the second version are configured identically.

The second setting of the receiving logic 410 may be carried out by the master subscriber 105. For example, the master subscriber 105 may specify a time window to the receiving logic 410 for which the receiving logic 410 is embodied to duplicate at least partially encrypted telegrams and to forward a first version of the at least partially encrypted telegram to the decryption unit 415 and a second version of the at least partially encrypted telegram to the processing unit 425. Furthermore, prior to sending the at least partially encrypted telegrams, the master subscriber 105 may output a switch-over telegram to the at least one slave subscriber 110, which the master subscriber 105 may use to embodied the receiving logic 410 with the second setting.

Moreover, the master subscriber 105 may be configured to set the receiving logic 410 to recognize an at least partially encrypted telegram for the second setting of the receiving logic 410 based on a formation of a header section of the at least partially encrypted telegram and then to forward the at least partially encrypted telegram to the decryption unit 415. For example, the master subscriber 105 may correspondingly mark the preamble of an at least partially encrypted telegram and set the receiving logic 410 with the marking to duplicate an at least partially encrypted telegram with the detected marking for the second setting and forward the first version of the duplicated at least partially encrypted telegram to the decryption unit 415 and the second version of the duplicated at least partially encrypted telegram to the processing unit 425.

If the check in the second step 807 shows that the receiving logic 410 does not have the second setting, which is indicated by the symbol n in the branching in the second step 807, the telegram output by the master subscriber 105 is not embodied as an at least partially encrypted telegram, but as an unencrypted telegram that does not require decryption by the decryption unit 415. If the check result of the second step 807 is negative, the receiving logic 410 forwards the unencrypted telegram in a third step 809 to the processing unit 425 of the slave subscriber 110 for processing on the fly. In a fourth step 811, the processing unit 425 forwards the unencrypted telegram to the output port 405, and the unencrypted telegram is output in a fifth step 813, which also marks the end of the method, via the output port 405 of the slave subscriber 110 to the subsequent slave subscriber. The third step 809 to the fifth step 813 are similar to the third step 715 to the fifth step 725 in FIG. 2.

If, on the other hand, the check of the second step 807 reveals that the second setting of the receiving logic 410 is present, which is indicated with the aid of the symbol j, the receiving logic 410 first generates a first version and second version of the at least partially encrypted telegram by duplicating the at least partially encrypted telegram. In a sixth step 815, the receiving logic 410 forwards the first version of the at least partially encrypted telegram to the decryption unit 415 for decryption. Additionally, the sixth step 815 includes forwarding the second version of the at least partially encrypted telegram from the receiving logic 410 to the processing unit 425. Furthermore, the sixth step 815 includes the decryption unit 415 buffering an encrypted portion of the first version of the at least partially encrypted telegram in the memory unit 420 and forwarding only an unencrypted portion of the first version to the processing unit 425.

For example, the receiving logic 410 may have been set to detect a read access telegram section from the master subscriber 105. It is e.g. conceivable that the master subscriber 105 identifies a header section of an at least partially encrypted telegram with a telegram section embodied as a read access, e.g. via the preamble, which differs in the case of the said telegram from the preamble of other telegrams of the master subscriber 105. Alternatively, the above-mentioned variants are conceivable for setting the receiving logic 410, via a time window or via a switch-over telegram.

In a seventh step 817, the receiving logic 410 may be configured as described for detecting an at least partially encrypted telegram having a telegram section with read access and this may be checked via a branch. If the receiving logic 410 cannot recognize the at least partially encrypted telegram as such with a telegram section with read access, indicated by the symbol n, it may be checked via a branch in an eighth step 819 whether the slave subscriber 110 is addressed with the at least partially encrypted telegram of the master subscriber 110. A negative result in the check of the eighth step 819 is again indicated by the symbol n and leads to the first reference point 1. The first reference point 1 leads to the fourth step 811, in which e.g. the second version of the at least partially encrypted telegram is forwarded via the processing unit 425 and from the processing unit 425 to the output port 405 for output to the subsequent slave subscriber, thus reaching the fifth step 813, i.e. the end of the second flowchart 800.

In addition to forwarding the second version of the at least partially encrypted telegram, the processing unit 425 may be configured to discard the first version of the at least partially encrypted telegram that the receiving logic 410 forwards to the decryption unit 415. In particular, the receiving logic 410 may be embodied to send a control signal to the decryption unit 415 to cause the decryption unit 415 to forward the first version of the at least partially encrypted telegram directly to the processing unit 425 if it is determined in the second version that the slave subscriber 110 is not addressed.

On the other hand, if the check in the eighth step 819 (indicated by the symbol j) determines that the slave subscriber 110 is addressed by the at least partially encrypted telegram of the master subscriber 105, the processing unit 425 processes an unencrypted portion of the second version in passing in a ninth step 821 and, if necessary, exchanges data with a data memory of the slave subscriber 110. After the unencrypted portion of the second version of the at least partially encrypted telegram has been processed, the processing unit 425 instantaneously routes the second version to the output port 405 of the slave subscriber 110 for output. In doing so, the processing unit 425 does not wait until the unencrypted portion of the second version has been fully processed, but begins forwarding the portion that has already been processed, even if a portion of the unencrypted portion of the second version has not yet been processed by the processing unit 425.

In a tenth step 823, the memory unit 420 of the decryption unit 415 checks for an encrypted portion of the first version of the at least partially encrypted telegram in a branch, whether the encrypted portion of the first version of the at least partially encrypted telegram that is buffered in the memory unit 420 corresponds to a data block size, i.e., the size in bytes of a data block of the telegram that the master subscriber 105 uses for encryption. If the check of the tenth step 823 determines that the encrypted portion of the first version of the at least partially encrypted telegram buffered in the memory unit 420 of the decryption unit 415 does not correspond to the data block size, the decryption unit 415 waits in an eleventh step 825 until the required minimum size in bytes, corresponding to the data block size, of the encrypted portion of the first version of the at least partially encrypted telegram is buffered in the memory unit 420. Therefore, the eleventh step 825 leads back to the branching, i.e. the tenth step 823.

Provided that the minimum size in bytes of the encrypted portion of the first version is present in the memory unit 420 (indicated by the symbol j), the decryption unit 415 is in a twelfth step 827 embodied to decrypt the encrypted portion of the first version with the key in the pass. For this purpose, in a thirteenth step 829, the decryption unit 415 performs a check via a branch for the presence of a suitable key for decryption. A negative check result of the thirteenth step 829 leads to the first reference point 1, i.e. to the fourth step 811, the forwarding of the first variant to the output port 405 of the slave subscriber 110 by the processing unit 425, and subsequently to the fifth step 813, the end. In the second setting of the receiving logic 410, the processing unit 425 is set to forward only one version of the at least partially encrypted telegram to the subsequent slave subscriber via the output port 405. Accordingly, the processing unit 425 may forward the second version to the output port 405 via the first reference point 1 and the fourth step 811, and may discard the first version of the at least partially encrypted telegram from the decryption unit 415 if a matching key is not available in order to ensure that only one version of the at least partially encrypted telegram is output via the output port 405.

If the decryption unit 415 has the appropriate key, the decryption unit 415 decrypts the encrypted portion of the first version of the at least partially encrypted telegram in a fourteenth step 831 in passing. Furthermore, the decryption unit 415 forwards the portion of the first version decrypted in passing to the processing unit 425. In a fifteenth step 833, the processing unit checks whether the slave subscriber 110 is addressed with the telegram. In the case of an EtherCAT telegram, this may e.g. be done by evaluating a datagram header section 590 in an Ethernet data section 510 of the telegram, i.e. by evaluating a command field 605 of an address field 615 and a second length field 620, as described above. If the slave subscriber 110 is not addressed, the processing unit 425 proceeds similarly to the thirteenth step 829 and forwards the second version to the output port 405 via the first reference point 1. The first version of the at least partially encrypted telegram may be discarded by the processing unit 425 to ensure that only one version of the at least partially encrypted telegram is forwarded to a subsequent slave subscriber via the output port 405.

Provided that the slave subscriber 110 is addressed by the at least partially encrypted telegram of the master subscriber 105, the processing unit 425 checks in a sixteenth step 835 by evaluating the decrypted portion of the first version whether the decrypted part is embodied as a telegram section with a write access. The check in the sixteenth step 835 requires the processing unit 425 to stop forwarding the second version at the location of the encrypted portion of the second version for evaluating the access type of the telegram section. If the telegram section is not embodied as a write access, the processing unit 425 discards a remaining portion of the first version following the location of the encrypted portion in a seventeenth step 837 so that only the second version is forwarded to the subsequent slave subscriber via the output port 405. The seventeenth step 837 leads to the end, i.e. fifth step 813, via a second reference point 2.

On the other hand, if the processing unit 425 has recognized the telegram section of the first version as a telegram section embodied with a write access by evaluating the aforementioned command field 605 in the case of an EtherCAT telegram, for example, the processing unit 425 discards the remaining part of the second version following the location of the encrypted part as well as the encrypted portion of the second version in an eighteenth step 839. In a nineteenth step 841, the processing unit 425 performs write access to the data memory of the slave subscriber 110, which may amount to an exchange of data with the first interface 440, the second interface 445, and the third interface 450 of the slave subscriber 110 in FIG. 4. In particular, the data is modified during a write access as compared to a read access.

Moreover, the nineteenth step 841 includes forwarding the modified data or the data to be modified from the first to third interfaces 440, 445, 450, as well as the decrypted portion of the first version and the remaining portion of the first version following the decrypted portion to the encryption unit 455 for encryption. Like the decryption unit 415, the encryption unit 455 may also comprise a memory unit, e.g. the encryption unit 455 comprises an encryption-unit-memory unit 460, which is e.g. used for buffering the data of the first version of the at least partially encrypted telegram received from the processing unit 425.

The encryption-unit-memory unit 460 checks in a branch in a twentieth step 843 whether the minimum size in bytes, i.e. the data block size of the decrypted portion of the first version buffered in the encryption-unit-memory unit 460 is present. In the case of a negative check result, expressed by the symbol n, the encryption unit 455 waits in a twenty-first step 845, to encrypt the decrypted portion and the remaining portion of the first version of the at least partially encrypted telegram following the location of the decrypted portion until the minimum size in bytes is buffered in the encryption-unit-memory unit 460.

Consequently, the twenty-first step 845 leads back to the twentieth step 843. If at least the data block size by which the master subscriber 105 encrypted the telegram at least partially with the key is buffered in the encryption-unit-memory unit 460, the encryption unit encrypts the aforementioned portions of the first version with the key in passing in a twenty-second step 847. Moreover, the twenty-second step 847 includes forwarding the encrypted portion of the first version to the output port 405 for output to the subsequent slave subscriber. The twenty-second step 847 further leads to the fifth step 813, the end of the second flowchart 800, via the second reference point 2.

A positive result of the seventh step 817, i.e. the recognition of an at least partially encrypted telegram as comprising a telegram portion embodied in the form of a read access, leads to the branching in the tenth step 823. In the tenth step 823, as described above, the memory unit 420 of the decryption unit 415 checks whether the data block size of the encrypted portion of the first version is buffered. If not, the eleventh step 825 waits until the data block size is received, as explained above.

Since the remaining twelfth through fifteenth steps 827 through 833 are similar in design to the above description, reference is made to the foregoing explanation for the description thereof and the description of the fifteenth step 833 is continued at that point. In the fifteenth step 833, the processing unit 425 uses a branch to check whether the slave subscriber 110 is addressed. This may be carried out by evaluating the above areas and data fields of the first version of the at least partially encrypted telegram, which is preferably embodied as an EtherCAT telegram. A negative check result of the fifteenth step 833 leads to the fourth step 811, i.e. the continuation of forwarding the second version to the output port 405 and the discarding of the first version of the at least partially encrypted telegram by the processing unit 425 via the first reference point 1. Finally, this is followed by the fifth step 813, i.e. the end.

The evaluation of the decrypted portion of the first version requires that the processing unit stop forwarding the second version to the output port 405 at the location of the encrypted portion of the second version. If the slave subscriber 110 is addressed, the processing unit 425 processes the decrypted portion of the first version and, however, discards the portion of the first version subsequent to the location of the decrypted portion in a twenty-third step 849 because the decrypted portion is embodied as a telegram portion with read access for the slave subscriber 110 and may be forwarded in an encrypted manner via the second version for the subsequent slave subscriber 110. Consequently, the processing unit 425 continues forwarding the second version, which the processing unit 425 has received directly from the receiving logic 410 and has stopped for evaluating the decrypted portion of the first version, to the output port 405 in a twenty-fourth step 851. The twenty-fourth step 851 leads to the second reference point 2, that is, the fifth step 813 and thus the end of the second flowchart 800.

FIG. 2 and FIG. 3 show a first flow chart and a second flow chart for the method for processing telegrams in the automation network 100 in FIG. 1. It is conceivable that individual method steps or individual steps may be varied without exceeding the protective scope of the invention.

Figure 4:
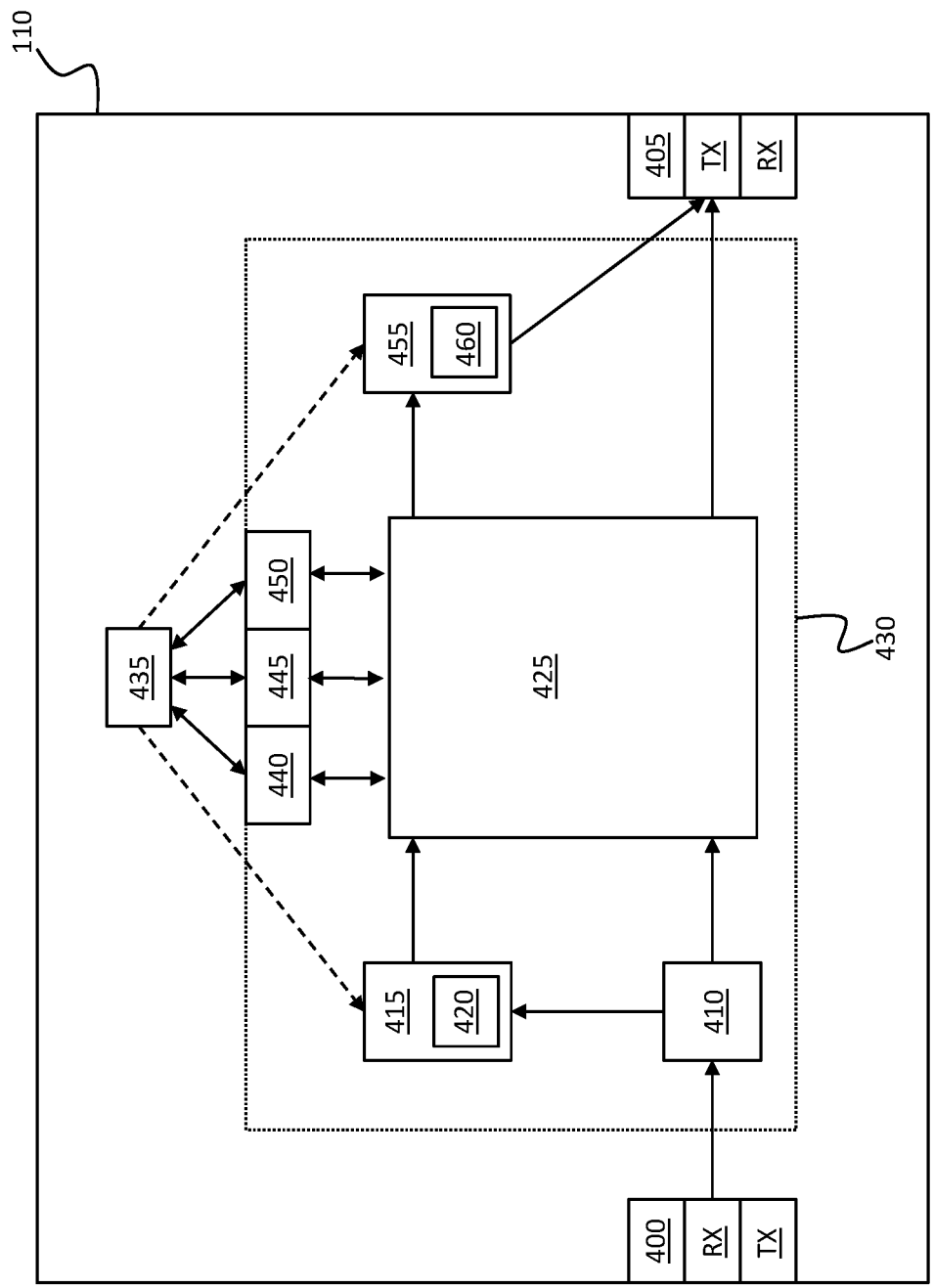
FIG. 4 shows a schematic structure of a network subscriber embodied as a slave subscriber.

FIG. 4 shows a schematic structure of the slave subscriber 110 in the automation network 100 in FIG. 1, which is embodied to decrypt at least partially encrypted telegrams of the master subscriber 105 in passing as well as to process them in passing and, as the case may be, also to encrypt them in passing. However, this feature is in particular not limited to the slave subscriber 110 in the automation network 100 in FIG. 1. The first further slave subscriber 115 and the second further slave subscriber 120 may also be embodied for this purpose.

The slave subscriber 110 comprises the input port 400 and the output port 405, to which further network subscribers 300 may be connected via the data line network 200. For example, the slave subscriber 110 may be connected to the master subscriber 105 via the input port 400 and the first data line 205 and to the first further slave subscriber 115 in FIG. 1 via the output port 405 and the second data line 210. In addition, the slave subscriber 110 may comprise other input ports and/or output ports. The slave subscriber 110 is embodied to receive telegrams output and at least partially encrypted by the master subscriber 105, via the input port 400 and to send them via the output port 405. Here, the symbols "RX" and "TX" at the input port 400 and at the output port 405 respectively stand for receipt or the receiver (RX: Receive or Receiver) and for transmission or the transmitter (TX: Transmit or Transmitter). The symbols are used to simplify the representation, in particular to indicate the receipt of telegrams encrypted by the master subscriber 105 via the input port 400 and the transmission by the slave subscriber 110 of telegrams that may have been re-encrypted by the slave subscriber 110 via the output port 405.

The slave subscriber 110 comprises a first processor chip 430 and a second processor chip 435. The first processor chip 430 comprises the processing unit 425. The processing unit 425 may be realized as a software module or as a hardware module or as a combined hardware and software module. Preferably, the first processor chip 430 is implemented as an EtherCAT slave controller and the second processor chip 435 is implemented as a microcontroller in the slave subscriber 110. The EtherCAT slave controller comprises a first interface 440 for exchanging data or information in the datagram data section 595 of register datagrams with the microcontroller. Furthermore, the EtherCAT slave controller comprises a second interface 445 for the EtherCAT slave controller to exchange data or information in the datagram data section 595 of a mailbox datagram with the microcontroller.

The processing of data or, respectively, information in the datagram data section 595 of a mailbox datagram is first carried out by the microcontroller and not by the EtherCAT slave controller as e.g. for data or, respectively, information in the datagram data section 595 of register datagrams or of process data datagrams. Data or, respectively, information for the latter datagram types are already respectively processed by the EtherCAT slave controller. Via a third interface 450, the EtherCAT slave controller may exchange data or information in the datagram data section 595 of a process data datagram with the microcontroller. The third interface 450 is generally used to exchange process data cyclically at short intervals. The exchange of data or, respectively, information via the individual first to third interfaces 440, 445, 450 is shown by the three arrows between the three interfaces and the microcontroller.

Telegrams sent unencrypted by the master subscriber 105 are selected by the receiving logic 410 of the slave subscriber 110 and forwarded directly to the processing unit 425 of the first processor chip 430 for processing on the fly. In order for the slave subscriber 110 to be able to decrypt the telegrams at least partially encrypted by the master subscriber 105, the slave subscriber 110 requires a secret key. Accordingly, the master subscriber 105 may be embodied to establish a trusted connection to the slave subscriber 110 prior to sending the at least partially encrypted telegrams via the data line network 200 and to transmit the secret key, which the master subscriber 105 uses to at least partially encrypt the telegrams by itself, to the slave subscriber 110 via the data line network using the trusted connection.

In this context, a trusted connection may be understood as a connection in which the master subscriber 105 first establishes a connection to the slave subscriber 110. After the master subscriber 105 and the slave subscriber 110 have been successfully authenticated, e.g. with certificates, the two connection partners may be classified as trustworthy. Data such as the secret key may then be transmitted over the trusted connection in encrypted form using an encryption protocol. The master subscriber 105 may thus encrypt the secret key using an encryption protocol, such as the TLS protocol (TLS: Transport Layer Security), and send the key encrypted via the TLS encryption protocol to the slave subscriber 110 in an EtherCAT telegram via the first data line 205. For example, the key may be located in the datagram data section 595 of a mailbox datagram of an EtherCAT telegram.

The slave subscriber 110 receives the EtherCAT telegram encrypted with the encryption protocol comprising the secret key via the input port 400 and forwards it to the receiving logic 410. The receiving logic 410 may e.g. have been set by the master subscriber 105, such that the receiving logic 410 directly forwards an EtherCAT telegram encrypted with the TLS encryption protocol to the microcontroller via the processing unit 425 and via the second interface 445 of the EtherCAT slave controller, since the microcontroller is e.g. embodied to decrypt the TLS encryption protocol and has a further decryption unit for this purpose. In addition, the microcontroller also has a further encryption unit.

Thus, the microcontroller decrypts the EtherCAT telegram encrypted with the TLS protocol which comprises the key of the master subscriber 105 via the further decryption unit and, after decryption, receives the key for decrypting the telegrams encrypted by the master subscriber 105 with the same key. The telegrams are preferably also embodied as EtherCAT telegrams, but will only be referred to as telegrams in the following. Subsequently, the microcontroller may forward the key to the decryption unit 415 of the first processor chip 430 and to the encryption unit 455 of the first processor chip 430. The forwarding of the secret key is indicated in FIG. 4 by the two arrows with dashed lines. The internal forwarding process of the secret key in the slave subscriber 110 is not visible from the outside, accordingly the secret key may be transmitted via a secure channel, i.e. the trusted connection secured to the slave subscriber 110 and the respective components of the slave subscriber 110 that require the key for decryption or encryption.

In this context, the first further slave subscriber 115 as well as the second further slave subscriber 120 may each receive the same key from the master subscriber 105 in the same manner as presented above for the slave subscriber 110. Furthermore, it is conceivable that the first further slave subscriber 115 as well as the second further slave subscriber 120 each receive a separate key that is different from the key of the slave subscriber 110. Moreover, it is also conceivable that the slave subscriber 110 has a plurality of decryption units 415 and, as the case may be, also a plurality of encryption units 455 and, in this connection, each datagram type of a telegram is encrypted with its own key by the master subscriber 105. The plurality of decryption units 415 or encryption units 455 may then each be embodied to decrypt a particular datagram type with the appropriate key and, as the case may be, to re-encrypt it after processing. In this context, both the decryption and the processing and the possible encryption by the slave subscriber 110 always refer in each case to an activity that may be carried out by the respective unit mentioned in the run.

In this context, it is conceivable that the master subscriber 105 sets the processing unit 425 of the slave subscriber 110 in such a way that the EtherCAT slave controller e.g. only accepts previously encrypted process data datagrams and/or only previously encrypted register datagrams for processing and discards process data datagrams and/or register datagrams that were not previously encrypted. The previous encryption of the process data datagrams and/or the previous encryption of the register datagrams may be detected by the processing unit 425 of the EtherCAT slave controller, for example, by the datagrams themselves, e.g. by the datagram header section 590, e.g. by a datagram identifier or by a data field or by a specific value, provided that the data or the information in the datagram data section 595 has been encrypted by the master subscriber 105. The process data datagrams and/or the register datagrams may have been decrypted in passing by the decryption unit 415 with the key, and then forwarded to the processing unit 425 of the EtherCAT slave controller for processing.

Furthermore, the master subscriber 105 may also be embodied to fully encrypt a telegram in each case. The master subscriber may comprise a master-subscriber-encryption unit for complete encryption of a telegram as well as for at least partial encryption. Said unit may be embodied as software or as hardware or as a combined hardware and software unit and may be used to encrypt each of the telegrams with the key. Thus, if the master subscriber 105 fully encrypts a telegram using the master-subscriber-encryption unit, then it is conceivable that the master subscriber 105 may set the processing unit 425 of the slave subscriber 110 such that the processing unit 425 may switch the mode of operation between fully encrypted telegrams and unencrypted telegrams.

For example, prior to sending fully encrypted telegrams, the master subscriber 105 may send a switch-over telegram to the slave subscriber 110 via the first data line 205. For example, prior to sending the switch-over telegram, the master subscriber 105 outputs unencrypted telegrams to the slave subscriber 110. The slave subscriber 110 receives the unencrypted telegrams via the input port 400 and forwards them to the receiving logic 410. The receiving logic 410 may be set as a sort of switch, so that the receiving logic 410 directly forwards the unencrypted telegrams to the processing unit 425 for processing. After processing in passing, i.e. in parallel to the continuous receipt of the telegram, the processing unit 425 of the EtherCAT slave controller may forward the unencrypted telegram to the output port 405. The slave subscriber 110 outputs the unencrypted telegram to the first further slave subscriber 115 via the output port 405 via the second data line 210.

The master subscriber 105 may send the switch-over telegram to the slave subscriber 110 as an unencrypted telegram. The slave subscriber 110 may receive the switch-over telegram via the input port 400 and forward it to the receiving logic 410. The receiving logic 410 may be embodied to forward the switch-over telegram to the processing unit 425 of the EtherCAT slave controller, so that the switch-over telegram runs through the path described above for an unencrypted telegram in the slave subscriber 110. The switch-over telegram may be used to switch over the receiving logic 410 as a switch, so that after the switch-over telegram the receiving logic 410 is embodied to forward the fully encrypted telegrams of the master subscriber 105 to the memory unit 420 of the decryption unit 415 of the slave subscriber 110 after being applied to the input port 400.

The term "applied" means that the first bit of the at least partially encrypted telegram may be received via the input port 400 of the slave subscriber 110. In FIG. 4, the decryption unit 415 comprises the memory unit 420. In an alternative embodiment, the memory unit 420 may be arranged separately from the decryption unit 415 in the first processor chip 430. The memory unit 420 of the first processor chip 430 of the slave subscriber 110 is required to allow a fully encrypted telegram to be decrypted by the decryption unit 415 in passing. The memory unit 420 may be embodied as a FIFO memory (FIFO: First In First Out).

The memory unit 420 is connected to the receiving logic 410 and to the decryption unit 415. The input port 400 is connected to the receiving logic 410 of the slave subscriber 110 and to the first data line 205 of the data line network 200. Moreover, the receiving logic 410 is connected to the processing unit 425. The decryption unit 415, as well, is connected to the processing unit 425. The EtherCAT slave controller is respectively connected to the microcontroller via the first interface 440, the second interface 445 and the third interface 450. The processing unit 425 is connected to both the encryption unit 455 and the output port 405. Finally, the encryption unit 455 of the first processor chip 430 also comprises a connection to the output port 405 of the slave subscriber 110 and comprises an encryption-unit-memory unit 460. The encryption-unit-memory unit 460 is embodied similarly to the memory unit 420 and therefore reference is made to the above description which applies to the encryption-unit-memory unit 460 as well, e.g. being embodied as a FIFO memory. The encryption-unit-memory unit 460 is required to buffer a required minimum size in bytes of the telegram, which is also used to encrypt again.

For the above explanation, fully encrypted telegrams of the master subscriber 105 were used as an example. However, this is not obligatory since the master subscriber 105 may also only partially encrypt the telegrams. Consequently, the features mentioned above for the fully encrypted telegrams also apply without restriction to at least partially encrypted telegrams. The features of the decryption unit 415, the memory unit 420, the encryption unit 455 and the encryption-unit-memory unit 460, as well, are not limited to fully encrypted telegrams, but apply without restriction also to at least partially encrypted telegrams. The following description is based on the use of at least partially encrypted telegrams. However, it also applies to fully encrypted telegrams.

The master subscriber 105 is embodied to at least partially encrypt the telegrams. For the at least partial encryption, the master subscriber 105 uses the master-subscriber-encryption unit. The master subscriber 105 encrypts respective data blocks of a telegram using the master-subscriber-encryption unit. Depending on the encryption method used, the data block size of the data blocks of the telegrams to be encrypted may differ. For example, the data block size may be 8 bytes or 16 bytes or an alternative number of bytes.

The individual encryption methods that the master subscriber 105 may implement are explained in more detail with reference to FIG. 5. If the master subscriber 105 encrypts the telegrams at least partially via the master-subscriber-encryption unit using a data block size of e.g. 16 bytes and sends them to the slave subscriber 110, the slave subscriber 110 buffers the telegrams in the memory unit 420 in each case as soon as they are present at the input port 400. The decryption unit 415 of the slave subscriber 110 is then embodied to wait with the decryption until the part of the telegram at least partially encrypted by the master subscriber 105 that is buffered in the memory unit 420 has the minimum length in bytes. The minimum length in bytes corresponds exactly to the data block size with which the master subscriber 105 has at least partially encrypted a telegram in each case. In the given example, this is 16 bytes.

Accordingly, the slave subscriber 110 delays a telegram at least partially encrypted by the master subscriber 105 in the memory unit 420 until the portion of the at least partially encrypted telegram buffered in memory unit corresponds to the data block size. In the mentioned example, the decryption unit 415 waits to decrypt the at least partially encrypted telegram of the master subscriber 105 until the portion of the at least partially encrypted telegram buffered in the memory unit 420 is 16 bytes. As soon as the 16 bytes of the at least partially encrypted telegram have been buffered in the memory unit 420, the decryption unit 415 begins decrypting the 16 bytes of the encrypted portion of the telegram in passing.

Thereby, the decrypted data is forwarded to the processing unit 425 at the same rate at which they were received from the slave subscriber 110.

Thus, in case of a partially encrypted telegram, all telegram bytes pass through the memory unit 420, since otherwise gaps could occur or it would be possible to overtake the bytes. However, the unencrypted parts of an at least partially encrypted telegram are not processed by the decryption unit 415 of the first processor chip 430, but are simply forwarded to the processing unit 425.

With the buffering of the next 16 bytes, the decryption unit 415 starts decrypting the next data block of the at least partially encrypted telegram, and so on. In this way, the at least partially encrypted telegrams of the master subscriber 105 may be decrypted in passing with a slight delay due to the buffering of the received portions of the telegrams in order to obtain the required minimum length in bytes corresponding to the data block size of the encryption. In particular, the on-the-fly decryption may thus be implemented without the complete prior receipt of an at least partially encrypted telegram.

Thus, the proposed method with the proposed subscribers may advantageously contribute to the reduction of the delay of an at least partially encrypted telegram. The delay of an at least partially encrypted telegram depends on whether the decryption and/or the encryption of the at least partially encrypted telegram may be performed in passing, i.e. in parallel to the receipt. In case this is possible, the delay results from the delay of the at least partially encrypted telegram in the memory unit 420 until the required data block size of the at least partially encrypted telegram has been received. As the case may be, the telegram in the encryption-unit-memory unit 460 is further delayed until the data block size has been received, in the event that the telegram is to be re-encrypted. In the event that decryption and/or encryption cannot be performed in parallel with the receipt of the at least partially encrypted telegram via the input port 400, the at least partially encrypted telegram must first be received in full before decryption may be performed, and in this way the delay caused by the encryption must be taken into account.

The reduction of the delay is particularly desirable to meet deadlines or to shorten response times in the automation network 100. In this context, the master subscriber 105 may reduce the delay of an at least partially encrypted telegram in the memory unit 420 of the slave subscriber 110, in which the master subscriber 105 implements the encryption of the data blocks of the telegrams with a smaller data block size, e.g. instead of using 16-byte data blocks, use data blocks with 8 bytes for encryption, etc.

The decryption unit 415 of the first processor chip 430 forwards the decrypted data block of the telegram at least partially encrypted by the master subscriber 105 to the processing unit 425, and the processing unit 425 processes the decrypted data block on the fly while the slave subscriber 110 may receive the remainder of the at least partially encrypted telegram via the input port 400 and the decryption unit 415 may be busy decrypting the next data block. While processing the decrypted portion of the telegram in passing, the EtherCAT slave controller may exchange data with the microcontroller, respectively.

In particular, if the data are changed during exchange, e.g. as part of a write access or write operation or a read-write access or read-write operation, the processing unit 425 of the EtherCAT slave controller may forward the processed data block of the telegram to the encryption unit 455 of the slave subscriber 110 for encryption. The encryption unit 455 includes the encryption-unit-memory unit 460, wherein the encryption-unit-memory unit 460 uses the same data block size for re-encryption as well as the secret key from the master subscriber 105 to ensure confidential telegram transmission via the output port 405 of the slave subscriber 110 and via the data line network 200 to the next slave subscriber.

The above description refers to the first setting of the receiving logic 410 in FIG. 2, i.e. to the exclusive forwarding of an at least partially encrypted telegram to the decryption unit 415 (as well as of an unencrypted telegram to the processing unit 425). The example has been chosen to simplify the description of FIG. 4. However, the invention is not limited to the first setting of the receiving logic 410, but may alternatively be implemented using the second setting of the receiving logic 410. Accordingly, the above features for the components of FIG. 4 also apply to the second setting of the receiving logic 410 in FIG. 3.

FIG. 5 shows a schematic structure of a data structure 500 which is used in the method for processing telegrams in the automation network 100 shown in FIG. 1. The data structure 500 is embodied as a telegram and may in particular be embodied as an Ethernet telegram and have a length of 64 to 1518 bytes or, if a TAG field is present, 64 to 1522 bytes. The data structure 500 in FIG. 3 comprises a first telegram structure TEL1 and comprises an Ethernet header section 505, an Ethernet data section 510 and an Ethernet end section 515. For example, the data structure 500 may be embodied according to IEEE standard 802.3 and comprise the Ethernet data frame format for a packet-oriented transmission of the data. If the data structure 500 is embodied for the real-time capable EtherCAT data transmission protocol in addition to complying with the Ethernet data frame structure, the data structure 500 comprises a second telegram structure TEL2. Preferably, the at least partially encrypted telegrams output by the master subscriber 105 are embodied as EtherCAT telegrams and may thus have the second telegram structure TEL2 in the basic structure.

The Ethernet header section 505 has a target address field 555, which comprises a target MAC address (MAC: Media Access Control) that identifies the network subscriber 300 in FIG. 1 that is to receive the EtherCAT telegram (so-called unicast address). The target MAC address may also be a multicast address (addressing of several network subscribers 300 in the automation network 100) or a broadcast address (addressing of all network subscribers 300 in the automation network 100). Following the target address field 555, the Ethernet header section 505 comprises a sender address field 560. The sender address field 560 includes a sender address, also embodied as a MAC address, that identifies the sender. The target address field 555 and the sender address field 560 each comprise 6 bytes.

Furthermore, the Ethernet header section 505 has a TAG field 565 following the sender address field 560. This may e.g. be embodied as a VLAN TAG TAG field in accordance with the IEEE 802.1Q standard (VLAN: Virtual Local Area Network) and comprise 4 bytes. Following the TAG field 565, the Ethernet header section 505 has a first data field 570. The first data field 570 may be embodied as a so-called "Ethertype" field, have 2 bytes and comprise a value indicating a used protocol of a next higher layer within user data, wherein a layer and a next higher layer are defined according to the OSI model (OSI: Open Systems Interconnection), i.e. the reference model for data transmission protocols in a layered architecture.

For example, the first data field 570 has the value 0x88A4 (in the hexadecimal system) if the telegram is embodied as an EtherCAT telegram, since this value is associated with the real-time capable EtherCAT data transmission protocol. The EtherType field, i.e. the first data field 570, comprises a first telegram identifier if the master subscriber 105 has encrypted the Ethernet data section 510 with the key in a first encryption method. In this case, the first telegram identifier is e.g. embodied as a value that differs from previous values in the hexadecimal system for indicating the protocol used for the next higher layer within the user data. In particular, the first telegram identifier may correspond to a new Ethertype value. According to the above description, the Ethernet end section 515 may e.g. not be part of the encryption. Alternatively, an embodiment is also conceivable in which the master subscriber 105 co-encrypts the Ethernet data section 510 as well as the Ethernet end section 515 and indicates the encryption via the first telegram identifier in the first data field 570.

The master subscriber 105 may set the receiving logic 410 of the slave subscriber 110 such that the receiving logic 410 may evaluate the first telegram identifier of the first data field 570 in the Ethernet header section 505. That is, the receiving logic 410 may be configured in this context to read or recognize the first telegram identifier in the first data field 570 of the Ethernet header section 505 and to associate with the first telegram identifier in the first data field 570 that the Ethernet data section 510 following the first telegram identifier is encrypted in the telegram. Without the TAG field 565, the Ethernet header section 505 may e.g. comprise 14 bytes.

For example, the master subscriber 105 may have switched the receiving logic 410 in advance to forward the at least partially encrypted telegrams to the memory unit 420 via a switch-over telegram. Accordingly, the receiving logic 410 may forward the telegram present at the input port 400 to the memory unit 420 using the second telegram structure TEL2 and evaluate the first telegram identifier in parallel with the forwarding. Also, the receiving logic 410 may be embodied to generate the first and second versions of the at least partially encrypted telegram, as has been described in connection with FIG. 3. The speed of decryption by the decryption unit 415 is thereby dictated by the speed at which a telegram may be received via the input port 400 of the slave subscriber 110. This results in the delay of the telegram in the memory unit 420 going unnoticed by the EtherCAT slave controller. The operations of decryption in passing as well as processing in passing and re-encryption via the encryption unit 455 of the slave subscriber 110 may thereby be carried out in a manner similar to the above description.

As an alternative to switching over the receiving logic 410 via of a switch-over telegram, the master subscriber 105 may also specify a time window and link this time window to the forwarding of the telegrams by the receiving logic 410. For example, prior to sending the telegram encrypted in the first encryption method, the master subscriber 105 could have set the receiving logic 410 to forward the subsequent telegrams (including the telegram encrypted in the first encryption method) via the memory unit 420 and the decryption unit 415.

In the second telegram structure TEL2, the Ethernet data section 510 of the data structure 500 comprises a further header section. Here, the further header section is embodied as an EtherCAT header section 525 that comprises instructions for the slave subscribers in the automation network 100. Furthermore, the Ethernet data section 510 comprises EtherCAT data that may be implemented in the form of datagrams. For example, the Ethernet data section 510 may comprise a first datagram 530, a second datagram 535, and an nth datagram 540, wherein the nth datagram 540 indicates that the data structure 500 may comprise any number of datagrams in total. At this point, however, no limitation is intended to be placed on any particular number of datagrams in the data structure 500.

Moreover, the Ethernet end section 515 has a checksum field 550 in the second telegram structure TEL2. Furthermore, the Ethernet end section 515 may have a padding field. The padding field is required to bring the EtherCAT telegram in the Ethernet data frame to the necessary minimum size of the Ethernet data frame of 64 bytes by inserting additional bytes added as a pad into the EtherCAT telegram. The padding field may be necessary if e.g. less than 46 or 42 bytes (without or with a VLAN TAG conforming to the IEEE 802.1Q standard) are to be transmitted with the EtherCAT telegram as user data, wherein a preamble and a start frame delimiter (SFD) field, which are not included in FIG. 5, are not counted. The checksum field 550 may be used to ensure an integrity check of transmitted data.

For example, the checksum field 550 may include a calculated CRC (Cyclic Redundancy Check) checksum that is calculated over the Ethernet data frame, starting with a target MAC address and ending with the padding field, so that the checksum itself is not included in the CRC checksum. The CRC checksum is generated by the sender and appended to the padding field. The receiver performs the same CRC checksum calculation after receiving the EtherCAT telegram, and if the CRC checksum calculated by the receiver does not match the CRC checksum transmitted with the EtherCAT telegram, the receiver assumes that data transmission was faulty. The EtherCAT telegram may be discarded by the receiver in such a case. For the present invention, it is not initially envisaged that the master subscriber 105, when at least partially encrypting the telegrams, integrates the Ethernet end section 515 with the checksum field 550 into the encryption. However, such an implementation in which the checksum field 550 is integrated is not excluded.

In a third telegram structure TEL3 of the data structure 500, the further header section, which is embodied as EtherCAT header section 525, comprises a first length field 575. The first length field 575 provides information on the length of the datagrams in the Ethernet data section 510. The first length field 575 comprises 11 bits. Following the first length field 575, the EtherCAT header section 525 comprises a first reserve field 580 of 1 bit. By default, the first reserve field is not used. Following the first reserve field 580, the EtherCAT head section 525 comprises a second data field 585 with 4 bits, which is embodied as a type field. The second data field 585 has a second telegram identifier. The second telegram identifier may be embodied as an EtherCAT protocol type.

For the EtherCAT protocol type, 16 different values are available for representation, i.e., the values from zero to 15, of which the value 0x1 in the hexadecimal system is already reserved for indicating processing of an EtherCAT telegram to the processing unit 425 of the EtherCAT slave controller and another value is reserved for indicating a blocking of processing of an EtherCAT telegram to the processing unit 425 of the EtherCAT slave controller. Consequently, the master subscriber 105 may e.g. use one of the remaining 13 values of the EtherCAT protocol type to indicate an encryption of at least one datagram in the Ethernet data section 510 in the second encryption method.

Additionally, the master subscriber 105 may indicate, e.g. via the first reserve field 580, that the master subscriber 105 has encrypted all datagrams in the Ethernet data section 510 with the key. Alternatively, the master subscriber 105 may merely encrypt individual datagrams with the key. The receiving logic 410 of the slave subscriber 110 may be configured to evaluate the second data field 585 with the second telegram identifier as well as the first reserve field 580, both in the EtherCAT header section 525. For this purpose, the receiving logic 410 may have been set by the master subscriber 105.

Also, the receiving logic 410 may have been set by the master subscriber 105 such that the receiving logic 410 forwards a telegram encrypted in the second encryption method, in which telegram individual datagrams or all datagrams are encrypted with the key, from the receiving logic 410 to the memory unit 420 and the decryption unit 415. For setting the forwarding of the datagrams by the receiving logic 410, variants described above may also be used in connection with the second encryption method, such as the switch-over datagram or the predetermined time window. For encrypting the individual datagrams or all datagrams in the Ethernet data section 510 in the second encryption method, the encryption of the checksum field 550 is not provided by default, but could be integrated as well.

For example, in a fourth telegram structure TEL4 of the data structure 500, the first datagram 530 (as well as the second datagram 535 and the nth datagram 540) may include a datagram header section 590 in the Ethernet data section 510. The datagram header section 590 may comprise 10 bytes. Following the datagram header section 590 may be a datagram data section 595 comprising up to 1486 bytes. Following the datagram data section 595 is a count field 600 comprising 2 bytes. The counting field 600 may be embodied as a so-called "working counter". A working counter may count the number of slave subscribers in the automation network 100 that could be successfully addressed by the EtherCAT telegram. This means that the EtherCAT slave controller of the respective slave subscriber 110 could be addressed by the EtherCAT telegram and, in addition, the addressed memory in the slave subscriber could be accessed.

A fifth telegram structure TEL5 shows a more detailed structure of the datagram header section 590 of the fourth telegram structure TEL4 of the data structure 500. The datagram header section 590 comprises a command field 605. The command field 605 comprises 8 bits and may be in the form of an "EtherCAT command type" and may cause the slave subscriber 110 or the processing unit 425 of the EtherCAT slave controller to do something via the values zero to 14. For example, writing data to the memory or reading data from the datagram data section 595 (read access or read operation) or inserting data into the datagram data section 595 (write access or write operation), and so on.

Following the command field 605, an index field 610 may be arranged in the fifth telegram structure TEL5. The index field 610 may also comprise 8 bits and may be used by the master subscriber 105 to identify lost or duplicated datagrams with an index or a value. The slave subscriber 110, on the other hand, may be embodied not to change the index or value of the index field 610. Following the index field 610, an address field 615 may be arranged. The address field 615 may comprise 32 bits and may be used to represent different addressing modes of the slave subscribers in the automation network 100. For example, each slave subscriber increments the position value by one in "auto increment address" mode, wherein a slave subscriber is addressed if the position value has a value of zero. In particular, the address field 615 may specify the data area in the slave subscriber 110 by which the slave subscriber 110 is to exchange data when passing through the datagram data section 595.

Following the address field 615 is a second length field 620 in the datagram header section 590. The second length field 620 comprises 11 bits and provides information about the length of the datagram data section 595 in the corresponding first datagram 530 (or in the second datagram 535 or in the nth datagram 540). Following the second length field 620, a third data field 625 may be disposed in the datagram header section 590. The third data field 625 may comprise 3 bits and may be in the form of a second reserve field and may provide unused buffer in the form of unused bits by default. In a third encryption method, the master subscriber 105 is embodied to encrypt the datagram data section 595 of at least one datagram with the key and to identify the encryption in the third data field 625 with a third telegram identifier in the datagram header section 590 of the at least one datagram.

The master subscriber 105 may set the receiving logic 410 so that the receiving logic 410 may evaluate the third telegram identifier in the third data field 625 in the datagram header section 590 of at least one datagram. For example, the third telegram identifier may be in the form of a value that the receiving logic 410 may interpret, as also described above in connection with the first telegram identifier and the second telegram identifier. Based on the setting carried out by the master subscriber 105, the receiving logic 410 may forward the received portion of a telegram, the datagram data section 595 of which of at least one datagram is encrypted to the memory unit 420 and the decryption unit 415.

The setting of the receiving logic 410 for forwarding the datagram data sections 595 of at least one datagram encrypted by the master subscriber 105 in the third encryption method may thereby be performed in a similar manner to the above description. Thus, for example, via the predefined or predetermined time window of the master subscriber 105, in which the master subscriber 105 outputs the datagram data sections 595 of at least one datagram of the EtherCAT telegrams encrypted in the third encryption method to the slave subscriber 110. Alternatively, as described above, the master subscriber 105 may also send the switch-over telegram to the slave subscriber 110 indicating to the slave subscriber that the master subscriber 105 switches the so far e.g. unencrypted telegram traffic to the telegram traffic encrypted in the third encryption method.

Following the third data field 625, a circulation field 630 is arranged in the datagram header section 590 in the fifth telegram structure TEL5. The circulation field 630 comprises 1 bit and may provide information with the two representable values on whether an Ethernet data frame has already circulated in the automation network 100, i.e. has passed through the individual slave subscribers on the forward line of the data line network 200. In particular, the circulation field 630 is intended to avoid multiple circulation of Ethernet data frames or telegrams in the automation network 100, since the EtherCAT slave controllers of the individual slave subscribers may each be embodied to detect and discard telegrams circulating in the automation network 100. A subsequent field 635 may be arranged downstream of the circulating field 630. The subsequent field 635 may comprise 1 bit and provide the EtherCAT slave controller of the respective slave subscriber with information on whether the current datagram is the last datagram in the telegram or whether further datagrams follow the current datagram.

Finally, a register field 640 may be disposed in the datagram header section 590. The register field 640 may comprise 16 bits and may inform the master subscriber 105 of events, such as interrupts, originating from one or more slave subscribers. The datagram data section 595 of a datagram may be processed in a number of ways by the processing unit 425 of the EtherCAT slave controller of the slave subscriber 110 on the fly. For example, the processing unit 425 of the EtherCAT slave controller of the slave subscriber 110 may insert data into the datagram data section 595 of one or more datagrams of an EtherCAT telegram in a write operation. Furthermore, the processing unit 425 of the EtherCAT slave controller of the slave subscriber 110 may first extract data from the datagram data section 595 of one or a plurality of datagrams of an EtherCAT telegram and subsequently insert data into the datagram data section 595 of one or more datagrams of an EtherCAT telegram in a read/write operation. Moreover, the processing unit 425 of the EtherCAT slave controller of the slave subscriber 110 may only extract data from the datagram data section 595 of one or of a plurality of datagrams of an EtherCAT telegram in a read operation. In this context, the datagrams may each be embodied as process data datagrams mentioned above or as register datagrams.

The master subscriber 105 may also be embodied to fully encrypt the data structure 500 shown in FIG. 5, i.e. including the Ethernet header section 505. If in such a case a network distributor is arranged between the master subscriber 105 and the slave subscriber 110, the network distributor cannot correctly evaluate the address information of the data structure 500 for forwarding due to it being encrypted. However, the problem may be remedied if the master subscriber 105 also sends the key by which it may fully encrypt the data structure 500 or the telegrams to the network distributor via the trusted connection so that the network distributor may decrypt the data structure 500 or the telegrams again.

Alternatively, if only the data, e.g. in the datagram data section 595, is encrypted by the master subscriber 105, the delay of the at least partially encrypted telegram in the memory unit 420 may be omitted. In particular, a read access to the data in the datagram data section 595 by the processing unit 425 of the EtherCAT slave controller of the slave subscriber 110 is executed only after the checksum field 550 of the telegram has been received and the processing unit 425 of the EtherCAT slave controller has performed a recalculation of the CRC checksum and has determined that the at least partially encrypted telegram has been completely transmitted. The decryption of the at least partially encrypted telegram may then be performed in parallel to the receipt. Since the decrypted telegram is not processed until the processing unit 425 of the EtherCAT slave controller has received and checked the checksum in the checksum field 550, enough time remains for the decryption by the decryption unit 415.

However, the situation is different for a write access to be executed. The data to be written into the datagram data section 595 of one or of a plurality of datagrams must be made available to the processing unit 425 of the EtherCAT slave controller in time for it to insert them. The data to be written cannot be provided immediately. To give the processing unit 425 of the EtherCAT slave controller more time to write, an intermediate field may be inserted between the datagram header section 590 and the datagram data section 595 into the at least partially encrypted telegram to enable the slave subscriber 110 to provide the data to be written and to decrypt the at least partially encrypted telegram even if the respective datagram has a very short runtime.

Re-encryption of the telegram by the encryption unit 455 of the slave subscriber 110 may thus be particularly advantageous for a write access or a read/write access, since the data in the datagram data section 595 is changed here.

The invention has been described in detail by preferred embodiment examples. Instead of the described embodiment examples, further embodiment examples are conceivable which may have further variations or combinations of described features. For this reason, the invention is not limited by the disclosed examples, since other variations may be devised by those skilled in the art without departing from the protective scope of the invention.

TABLE 1

List of Reference Numerals: 100-700

100 Automation network
105 Master subscriber
110 Slave subscriber
115 First further slave subscriber
200 Data line network
205 First data line
210 Second data line
215 Third data line
300 Network subscribers
400 Input port
405 Output port
410 Receiving logic
415 Decryption unit
420 Memory unit
425 Processing unit
430 First processor chip
435 Second processor chip
440 First interface
445 Second interface
450 Third interface
455 Encryption unit
460 Encryption-unit-memory unit
RX Receipt
TX Transmission
500 Data structure
505 Ethernet header section
510 Ethernet data section
515 Ethernet end section
525 ETherCAT header section
530 First datagram TABLE 1-continued List of Reference Numerals: 100-700

535 Second datagram
540 n-th datagram
550 Checksum field
555 Target address field
560 Sender address field
565 TAG field
570 First data field
575 First length field
580 First reserve field
585 Second data field
590 Datagram header section
595 Datagram data section
600 Counting field
605 Command field
610 Index field
615 Address field
620 Second length field
625 Third data field
630 Circulation field
635 Subsequent field
640 Register field
700 First flowchart

TABLE 2

List of Reference Numerals: 800-TEL5

800 Second flowchart
1 First reference
2 Second reference
705 First method step
710 Second method step
715 Third method step
720 Fourth method step
725 Fifth process step
730 Sixth process step
735 Seventh process step
740 Eighth process step
745 Ninth process step
750 Tenth process step
755 Eleventh process step
760 Twelfth process step
765 Thirteenth process step
770 fourteenth process step
775 Fifteenth process step
780 Sixteenth process step
785 Seventeenth process step
790 Eighteenth process step
795 Nineteenth procedural step
805 First step
807 Second step
809 Third step
811 Fourth step
813 Fifth step
815 Sixth step
817 Seventh step
819 Eighth step
821 Ninth step
823 Tenth step
825 Eleventh step
827 Twelfth step
829 Thirteenth step
831 Fourteenth step
833 Fifteenth step
835 Sixteenth step
837 Seventeenth step
839 Eighteenth step
841 Nineteenth step
843 Twentieth step
845 Twenty-first step
847 Twenty-second step
849 Twenty-third step
851 Twenty-fourth step
TEL1 First telegram structure
TEL2 Second telegram structure TABLE 2-continued List of Reference Numerals: 800-TEL5

TEL3 Third telegram structure
TEL4 Fourth telegram structure
TEL5 Fifth telegram structure

The invention claimed is:

1. A method for processing telegrams in an automation network comprising a plurality of network subscribers, wherein:
at least one of the network subscribers is configured as a primary subscriber and at least one of the network subscribers is configured as a secondary subscriber,
wherein the primary subscriber is configured to output telegrams to the at least one secondary subscriber, and
wherein the primary subscriber is configured to at least partially encrypt the telegrams;
wherein the at least one secondary subscriber comprises an input port, a receiving logic connected to the input port, a decryption unit connected to the receiving logic and a processing unit configured to process telegrams in passing and connected to the encryption unit and the receiving logic;
wherein the receiving logic is configured, in the event that a telegram at least partially encrypted by the primary subscriber is present at the input port of the at least one secondary subscriber, to forward the at least partially encrypted telegram to the encryption unit,
wherein the decryption unit is configured to decrypt an encrypted portion of the at least partially encrypted telegram on the fly with a key and to forward it to the processing unit, and
wherein the processing unit is configured to process the decrypted portion of the at least partially encrypted telegram on the fly; and
wherein the receiving logic is configured, in the event that a telegram unencrypted by the primary subscriber is present at the input port of the at least one secondary subscriber, to forward the unencrypted telegram to the processing unit,
wherein the processing unit is configured to process the unencrypted telegram on the fly.

2. The method according to claim 1, wherein:
the at least one secondary subscriber comprises an output port and an encryption unit connected to the processing unit and the output port,
wherein the at least one secondary subscriber is connected to the subsequent secondary subscriber via the output port via a data line network, and
wherein the processing unit is configured to forward the decrypted part of the at least partially encrypted telegram to the decryption unit; and
wherein the encryption unit is configured to decrypt the encrypted portion of the at least partially encrypted telegram with the key on the fly and to forward it to the output port.

3. The method according to claim 2, wherein:
the receiving logic is configured to generate a first version and a second version of an at least partially encrypted telegram by duplicating the at least partially encrypted telegram,
wherein the receiving logic is configured to forward the first version to the decryption unit and the second version to the processing unit, and wherein the processing unit is configured to process an unencrypted portion of the second version on the fly and to forward it to the output port;

wherein the processing unit is configured to stop the forwarding of the second version to the output port at the location of the encrypted portion of the second version, provided that the encrypted portion of the telegram section comprises a write operation for the processing unit;

wherein the processing unit is configured to carry out the write access for the portion of the first version decrypted by the decryption unit and forwarded to the processing and thus to process said portion of the first version on the fly and subsequently forward it to the encryption unit for encryption, wherein the encryption unit is configured to encrypt the decrypted portion of the first version on the fly and to forward it to the output port; and wherein, provided that the encrypted portion of the second version comprised a telegram section with a write access for the processing unit, the processed portion of the unencrypted portion of the second version is linked to the encrypted portion of the first version prior to output via the output port.

4. The method according to claim 2, wherein:

the receiving logic is configured to generate a first version and a second version of an at least partially encrypted telegram by duplicating the at least partially encrypted telegram, wherein the receiving logic is configured to forward the first version to the decryption unit and the second version to the processing unit, and wherein the processing unit is configured to process an unencrypted portion of the second version on the fly and to forward it to the output port;

wherein the processing unit is configured, provided that the encrypted portion of the second version comprises a read access for the processing unit, to forward the encryption portion of the second version to the output port and to carry out the read access for the portion of the first version decrypted by the decryption unit and forwarded to the processing unit and thus to process said portion of the first version on the fly; and wherein, provided that the encrypted portion of the second version comprised a telegram section with a read access for the processing unit, the processed part of the unencrypted portion of the second version is linked to the encrypted portion of the second version prior to output via the output port.

5. The method according to claim 2, wherein:

the receiving logic is configured to generate a first version and a second version of an at least partially encrypted telegram by duplicating of the at least partially encrypted telegram, wherein the receiving logic is configured to forward the first version to the decryption unit and the second version to the processing unit, and wherein the processing unit is configured to forward an unencrypted portion of the second version on the fly and to forward it to the output port;

wherein, in the event that an encrypted portion of the second version does not comprise a write access for the processing unit nor a read access for the processing unit, the processing unit is configured to forward the encrypted portion of the second version to the output port; and wherein, provided that the encrypted portion of the second version did not comprise a telegram section with a write access for the processing unit and no telegram section with a read access for the processing unit, the processed portion of the unencrypted portion of the second version is linked to the encryption portion of the second version prior to output via the output port.

6. The method according to claim 1, wherein:

the telegrams are configured as Ethernet telegrams and each comprises an Ethernet header section and an Ethernet data section; and wherein, in a first encryption method, the primary subscriber is configured to encrypt the Ethernet data section of an Ethernet telegram with a key and to indicated the encryption of the Ethernet data section by a first telegram identifier in the Ethernet header section, wherein the receiving logic of the at least one secondary subscriber is configured to evaluate the first telegram identifier in the Ethernet header section.

7. The method according to claim 1, wherein:

the telegrams are configured as Ethernet telegrams and each comprises an Ethernet header section and an Ethernet data section, and wherein the Ethernet data section comprises a further header section and datagrams;

wherein, in a second encryption method, the primary subscriber is configured to encrypt at least a datagram with a key and to indicate the encryption of the at least one datagram by a second telegram identifier in the further header section, wherein the receiving logic of the at least one secondary subscriber is configured to evaluate the second telegram identifier in the further header section.

8. The method according to claim 1, wherein:

the telegrams are configured as Ethernet telegrams and each comprises an Ethernet header section and an Ethernet data section, wherein the Ethernet data section comprises a further header section and datagrams, and wherein the datagrams each comprise a datagram header section and a datagram data section; and wherein, in a third encryption method, the primary subscriber is configured to encrypt the datagram data section of at least a datagram with the key and to indicate the encryption of the datagram data section of the at least one datagram by a third telegram identifier in the datagram header section, wherein the receiving logic of the at least one secondary subscriber is configured to evaluate the third telegram identifier in the datagram header section.

9. The method according to claim 7, wherein the datagrams of the Ethernet data section are each configured as process data datagrams and/or as mailbox datagrams and/or as register datagrams.

10. The method according to claim 1, wherein:

the primary subscriber is configured to define a time window in which the primary subscriber outputs at least partially encrypted telegrams to the at least one secondary subscriber; and the receiving logic is configured to forward the at least partially encrypted telegram to the decryption unit for decryption within the predefined time window.

11. The method according to claim 1, wherein:

the primary subscriber is configured to output a switchover telegram to the at least one secondary subscriber prior to sending the at least partially encrypted telegram; and the receiving logic is configured to forward the at least partially encrypted telegram to the decryption unit for decryption after receiving the switch-over telegram.

12. The method according to claim 1, wherein the receiving logic is configured to discern telegrams at least partially encrypted by the primary subscriber and telegrams unencrypted by the primary subscriber on the basis of a formation of the telegrams in which, in each case, a header section of the at least partially encrypted telegrams is configured differently from a header section of the unencrypted telegrams.

13. The method of claim 1, wherein:
the primary subscriber is configured to establish a trustworthy connection with the at least one secondary subscriber,
wherein the master subscriber is configured to encrypt the key, by which the primary subscriber at last partially encrypts the telegrams, by an encryption protocol and to transmit them to the at least one secondary subscriber via the trustworthy connection; and
wherein the at least one secondary subscriber is configured to decrypt the key encrypted by the encryption protocol in order to be able to decrypt the at least partially encrypted telegrams of the primary subscriber with the key.

14. An automation network, wherein:
the automation network comprises a plurality of network subscribers,
wherein the network subscribers of the automation network are configured in a primary-secondary structure, so that at least one of the network subscribers is configured as a primary subscriber and at least one of the network subscribers is configured as a secondary subscriber,
wherein the primary subscriber is configured to output telegrams to the at least one secondary subscriber, and
wherein the primary subscriber is configured to at least partially encrypt the telegrams;
wherein the at least one secondary subscriber comprises an input port, a receiving logic connected to the input port, a decryption unit connected to the receiving logic and a processing unit configured to process telegrams in passing and connected to the encryption unit and the receiving logic;
wherein the receiving logic is configured, in the event that a telegram at least partially encrypted by the primary subscriber is present at the input port of the at least one secondary subscriber, to forward the at least partially encrypted telegram to the encryption unit;
wherein the decryption unit is configured to decrypt an encrypted portion of the at least partially encrypted telegram on the fly with a key and to forward it to the processing unit,
wherein the processing unit is configured to process the decrypted portion of the at least partially encrypted telegram on the fly; and
wherein the receiving logic is configured, in the event that a telegram unencrypted by the primary subscriber is present at the input port of the at least one secondary subscriber, to forward the unencrypted telegram to the processing unit,
wherein the processing unit is configured to process the unencrypted telegram on the fly.

15. A primary subscriber for an automation network according to claim 14, wherein:
the primary subscriber comprises a primary-secondary encryption unit; and
the master subscriber primary-secondary encryption unit is configured to encrypt the telegrams generated by the primary subscriber.

16. A secondary subscriber for an automation network according to claim 14, wherein:
the secondary subscriber comprises a first processor chip and a second processor chip,
wherein the first processor chip comprises a processing unit,
wherein the first processor chip is configured as an EtherCAT secondary controller and the second processor chip is configured as a micro-controller, and
wherein the EtherCAT secondary controller comprises an interface and the EtherCAT secondary controller is connected to the micro-controller via the interface;
wherein the primary subscriber is configured to respectively establish the trustworthy connection to the interface of the EtherCAT secondary controller of the secondary subscriber in order to encrypt the key, by which the primary subscriber at least partially encrypts the telegrams, by the encryption protocol and to forward it to the EtherCAT secondary controller of the secondary subscriber via the trustworthy connection; and
wherein the EtherCAT secondary controller is configured to forward the key encrypted by the encryption protocol to the micro-controller via the interface,
wherein the micro-controller is configured to decrypt the key encrypted by the primary subscriber by the encryption protocol and to forward the key to the decryption unit and to the encryption unit.

17. The secondary subscriber according to claim 16, wherein:
the decryption unit of the secondary subscriber comprises a memory unit, which is connected to the receiving logic,
wherein the decryption unit is configured to buffer the encrypted portion of the telegram at least partially encrypted by the primary subscriber in the memory unit until the encrypted portion of the at least partially encrypted telegram corresponds to a predefined length in byte; and
wherein the predefined length in bytes corresponds to a data block size by which the primary subscriber in each case encrypts data blocks of a telegram.

18. The secondary subscriber according to claim 16, wherein the encryption unit is configured, in the event that at least the predetermined length in byte of the encrypted portion of the at least partially encrypted telegram has been buffered in the memory unit, to decrypt the encrypted portion of the at least partially encrypted telegram.

19. The secondary subscriber according to claim 16, wherein:
the encryption unit comprises an encryption-unit-memory unit connected to the output port,
wherein the encryption unit is configured to buffer the decrypted portion of the at least partially encrypted telegram in the encryption-unit-memory unit until the decrypted portion of the at least partially encrypted telegram corresponds to the predetermined length in byte; and
wherein the encryption unit is configured to encrypt the decrypted portion of the at least partially encrypted telegram, provided that the decrypted portion of the at least partially encrypted telegram in the encryption-unit-memory unit at least corresponds to the predetermined length in byte.

* * * * *

UNITED STATES PATENT AND TRADEMARK OFFICE
CERTIFICATE OF CORRECTION

PATENT NO. : 12,069,033 B2
APPLICATION NO. : 17/686366
DATED : August 20, 2024
INVENTOR(S) : Holger Büttner et al.

It is certified that error appears in the above-identified patent and that said Letters Patent is hereby corrected as shown below:

In the Claims

At Column 42, Line 1 (Claim 15, Line 1):
"the primary subscriber comprises a master-subscriber primary-secondary encryption unit"
Should be:
--the primary subscriber comprises a primary-secondary encryption unit--

Signed and Sealed this
Fifteenth Day of October, 2024

Katherine Kelly Vidal
*Director of the United States Patent and Trademark Office*